(12) United States Patent
Saiki

(10) Patent No.: US 9,638,084 B2
(45) Date of Patent: May 2, 2017

(54) HOLDING SEALING MATERIAL, METHOD FOR MANUFACTURING HOLDING SEALING MATERIAL, EXHAUSTED GAS PURIFYING APPARATUS, AND METHOD FOR MANUFACTURING EXHAUST GAS PURIFYING APPARATUS

(71) Applicant: IBIDEN CO., LTD., Ogaki-shi (JP)

(72) Inventor: Kenzo Saiki, Takahama (JP)

(73) Assignee: IBIDEN CO., LTD., Ogaki-shi (JP)

( * ) Notice: Subject to any disclaimer, the term of this patent is extended or adjusted under 35 U.S.C. 154(b) by 438 days.

(21) Appl. No.: 14/242,988

(22) Filed: Apr. 2, 2014

(65) Prior Publication Data
US 2014/0212340 A1 Jul. 31, 2014

Related U.S. Application Data

(63) Continuation of application No. PCT/JP2012/075350, filed on Oct. 1, 2012.

(30) Foreign Application Priority Data

Oct. 5, 2011 (JP) .................................. 2011-221413

(51) Int. Cl.
| | |
|---|---|
| *F01N 3/28* | (2006.01) |
| *F01N 3/021* | (2006.01) |
| *D06H 7/00* | (2006.01) |
| *B01J 35/04* | (2006.01) |

(52) U.S. Cl.
CPC ............. *F01N 3/2864* (2013.01); *D06H 7/00* (2013.01); *F01N 3/0211* (2013.01); *B01J 35/04* (2013.01); *Y02T 10/20* (2013.01); *Y10T 29/49826* (2015.01)

(58) Field of Classification Search
None
See application file for complete search history.

(56) References Cited

U.S. PATENT DOCUMENTS

| | | | | |
|---|---|---|---|---|
| 5,332,609 A | * | 7/1994 | Corn ..................... | F01N 3/2857 422/179 |
| 6,158,120 A | | 12/2000 | Foster et al. | |
| 2004/0022699 A1 | * | 2/2004 | Fukushima ........... | F01N 3/0211 422/179 |

FOREIGN PATENT DOCUMENTS

| | | | |
|---|---|---|---|
| DE | 2400443 | 7/1975 | |
| DE | 19804213 | 8/1999 | |
| EP | 0997618 | 5/2000 | |
| EP | 1010871 | 6/2000 | |
| EP | 1010871 A2 * | 6/2000 | ........... F01N 3/2857 |
| EP | 1908935 A1 * | 4/2008 | ........... F01N 3/2853 |
| JP | 2902414 B2 | 4/1991 | |
| JP | 9-507463 | 7/1997 | |
| JP | 2001-070215 | 3/2001 | |
| JP | 2002-147231 | 5/2002 | |
| JP | 2007-218221 | 8/2007 | |
| JP | 2009-264186 | 11/2009 | |
| JP | 2009-264187 | 11/2009 | |

(Continued)

*Primary Examiner* — Walter D Griffin
*Assistant Examiner* — Jelitza Perez
(74) *Attorney, Agent, or Firm* — Mori & Ward, LLP

(57) ABSTRACT

A holding sealing material includes a one-sheet mat including inorganic fibers. The one-sheet mat includes a first mat with a first side face and a second mat with a second side face. A part of the first side face and a part of the second side face are foldably and integrally connected.

16 Claims, 18 Drawing Sheets

(56) References Cited

FOREIGN PATENT DOCUMENTS

| WO | WO 94/12328 | 6/1994 |
| WO | WO 2011/035116 | 3/2011 |

\* cited by examiner

B-B line cross-sectional view

FIG. 17A
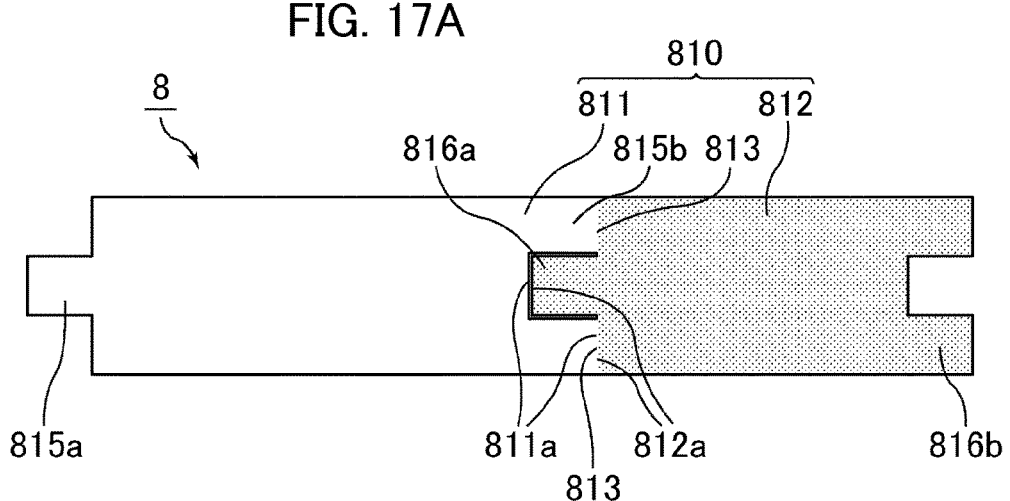
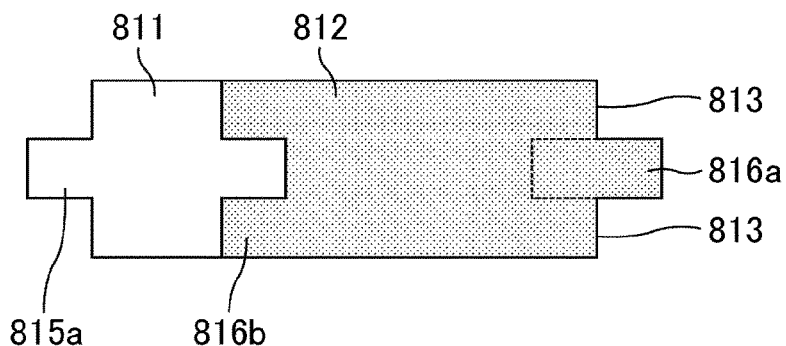
FIG. 17B
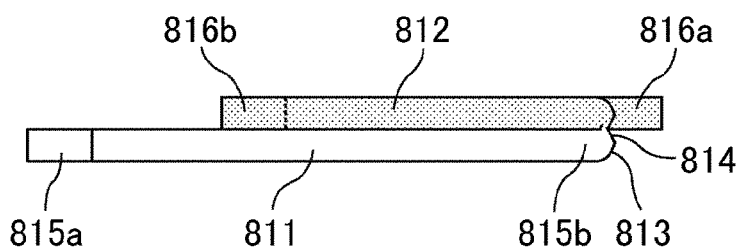
FIG. 17C

FIG. 18A
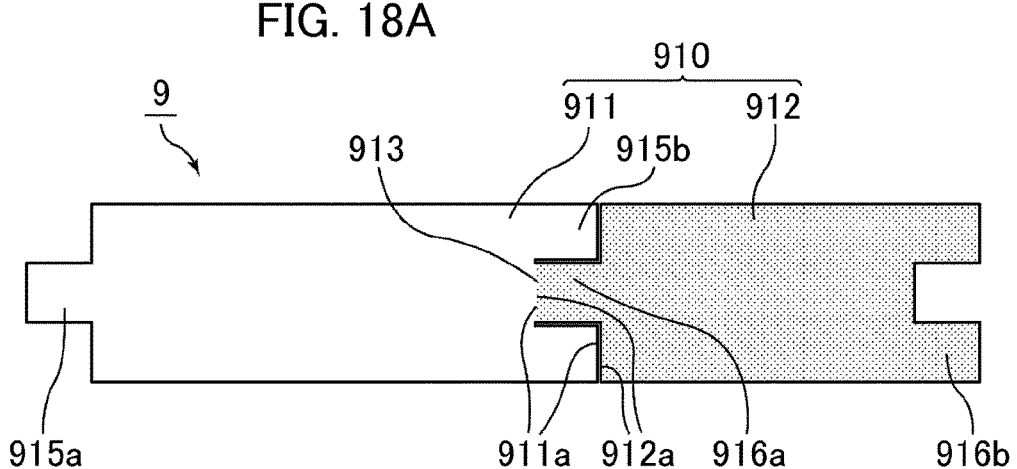
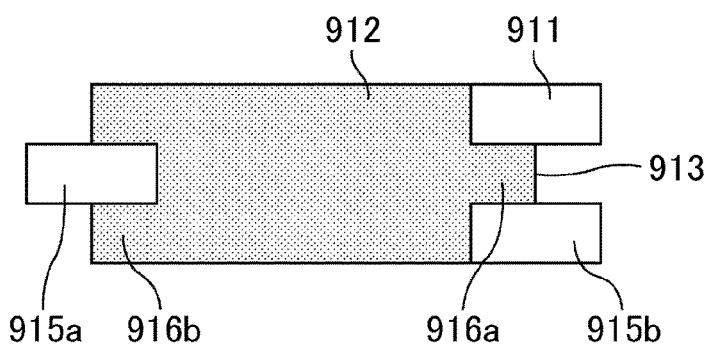
FIG. 18B
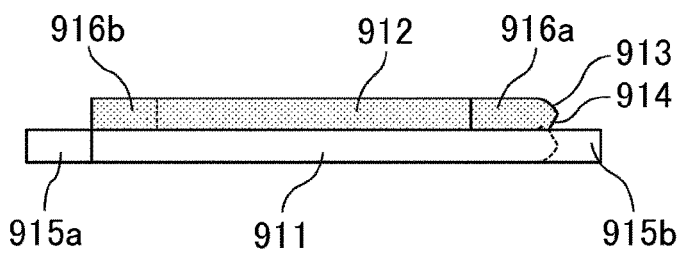
FIG. 18C

HOLDING SEALING MATERIAL, METHOD FOR MANUFACTURING HOLDING SEALING MATERIAL, EXHAUSTED GAS PURIFYING APPARATUS, AND METHOD FOR MANUFACTURING EXHAUST GAS PURIFYING APPARATUS

CROSS-REFERENCE TO RELATED APPLICATIONS

The present application is a continuation application of International Application No. PCT/JP2012/075350, filed Oct. 1, 2012, which claims priority to Japanese Patent Application No. 2011-221413, filed Oct. 5, 2011. The contents of these applications are incorporated herein by reference in their entirety.

BACKGROUND OF THE INVENTION

Field of the Invention

The present invention relates to a holding sealing material, a method for manufacturing a holding sealing material, an exhausted gas purifying apparatus, and a method for manufacturing an exhaust gas purifying apparatus.

Discussion of the Background

Exhaust gases that are emitted from internal combustion engines such as diesel engines contain particulate matters (hereinafter, also referred to as PMs). PMs that are harmful to the environment and human body have been recently recognized as problems. Exhaust gases also contain harmful gases such as CO, HC, and NOx. Thus, adverse effects on the environment and human body by these harmful gases are also being worried.

For collecting PMs and purifying those harmful gases in exhaust gases, various exhaust gas purifying apparatuses are proposed. Such an exhaust gas purifying apparatus includes an exhaust gas treating body formed of porous ceramic such as silicon carbide or cordierite, a casing accommodating the exhaust gas treating body, and a holding sealing material placed between the exhaust gas treating body and the casing. The holding sealing material is mainly used for preventing the exhaust gas treating body from breaking by a collision, due to vibration or impacts during driving a car or the like, with the casing that covers the outer periphery of the exhaust gas treating body; and for preventing exhaust gases from leaking from a gap between the exhaust gas treating body and the casing.

An internal combustion engine is typically driven at a ratio close to the theoretical air fuel ratio for improving fuel economy, and thus tends to increase the temperature and the pressure of exhaust gases. When exhaust gases with a high temperature and a high pressure are carried into an exhaust gas purifying apparatus, due to the difference between the coefficient of thermal expansion of an exhaust gas treating body and that of a casing, the size of a gap between the exhaust gas treating body and the casing is changed. Thus, holding sealing materials are required to have a stable holding ability that is not affected by changes of the size of the gap. In addition, holding sealing materials are being more and more required to have thermal insulation performance for thermally insulating an exhaust gas treating body so that the exhaust gas treating body can efficiently exhibit the exhaust gas purifying performance.

Recently, a new configuration of a holding sealing material is adopted in which a holding sealing material with a larger thickness is used to enhance the thermal insulation performance. In such a holding sealing material, the repulsive force of inorganic fibers, which imparts holding ability to the holding sealing material, needs to be ensured by increasing the weight per unit area of the holding sealing material.

However, the larger the thickness of the holding sealing material is, the less the holding sealing material tends to achieve a sufficient peeling strength in needling carried out in a manufacturing process for increasing the peeling strength in the thickness direction. Such an insufficient peeling strength may cause the holding sealing material to have a significant shear deformation when an exhaust gas treating body wound with the holding sealing material is stuffed into a casing.

Another configuration of a holding sealing material is that plural mats each having the same weight as a conventional holding sealing material are used to increase the total weight, instead of changing the thickness of the holding sealing material. As such an example, a holding sealing material (JP-A 2007-218221) having the following configuration is disclosed. In the holding sealing material, plural mats that each have a pair of fitting portions and thermal insulation performance are layered. The plural mats each have a proper length for being wound without gaps, and the pair of fitting portions of the mats is configured to fit to each other when the mats are layered and wound around a monolith.

In addition, holding sealing materials having plural mats layered and sewn by a sewing machine to be fixed are disclosed (JP-A 2009-264186 and JP-A 2009-264187).

SUMMARY OF THE INVENTION

According to one aspect of the present invention, a holding sealing material includes a one-sheet mat including inorganic fibers. The one-sheet mat includes a first mat with a first side face and a second mat with a second side face. A part of the first side face and a part of the second side face are foldably and integrally connected.

According to another aspect of the present invention, in a method for manufacturing a holding sealing material, a mat material including inorganic fibers is prepared. A one-sheet mat including a first mat with a first side face and a second mat with a second side face is punched out from the mat material in such a manner that a part of the first side face and a part of the second side face are foldably and integrally connected. A portion where the first mat and the second mat are connected is folded to layer the first mat and the second mat.

According to further aspect of the present invention, an exhausted gas purifying apparatus includes an exhaust gas treating body, a casing, and a holding sealing material. The casing accommodates the exhaust gas treating body. The holding sealing material is wound around the exhaust gas treating body and placed between the exhaust gas treating body and the casing. The holding sealing material includes a one-sheet mat including inorganic fibers. The one-sheet mat includes a first mat with a first side face and a second mat with a second side face. A part of the first side face and a part of the second side face are foldably and integrally connected. The holding sealing material is placed between the exhaust gas treating body and the casing in such a manner that a portion where the first mat and the second mat are foldably connected is folded to layer the first mat and the second mat.

According to further aspect of the present invention, in a method for manufacturing an exhaust gas purifying apparatus, a holding sealing material is provided. The holding sealing material includes a one-sheet mat that includes inorganic fibers. The one-sheet mat includes a first mat with a first side face and a second mat with a second side face. A part of the first side face and a part of the second side face are foldably and integrally connected. The holding sealing material is provided by folding a portion where the first mat and the second mat are foldably connected to layer the first mat and the second mat. The holding sealing material is wound around an exhaust gas treating body. The exhaust gas treating body wound with the holding sealing material is accommodated in a casing.

According to further aspect of the present invention, a holding sealing material includes a one-sheet mat that includes inorganic fibers. The one-sheet mat includes a first rectangular mat, a second rectangular mat, and a border line between the first rectangular mat and the second rectangular mat. The first rectangular mat is substantially rectangular in a plan view. The second rectangular mat is substantially rectangular in a plan view and integrally connected to the first rectangular mat. The border line between the first rectangular mat and the second rectangular mat is part of a side of a rectangle of the first rectangular mat in a plan view and part of a side of a rectangle of the second rectangular mat in a plan view. The first rectangular mat and the second rectangular mat are configured to be layered by folding the one-sheet mat along the border line.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 17A illustrates a schematic plan view of an example of the holding sealing material according to the seventh embodiment of the present invention.

FIG. 17B illustrates a schematic plan view of the holding sealing material illustrated in FIG. 17A, in which the portions where the first mat and the second mat are connected are folded to layer the first mat and second mat.

FIG. 17C illustrates a front view of FIG. 17B.

FIG. 18A illustrates a schematic plan view of another example of the holding sealing material according to the seventh embodiment of the present invention.

FIG. 18B illustrates a schematic plan view of the holding sealing material illustrated in FIG. 18A, in which the portion where the first mat and the second mat are connected is folded to layer the first mat and the second mat.

FIG. 18C illustrates a front view of FIG. 18B.

DESCRIPTION OF THE EMBODIMENTS

Figure 1A:
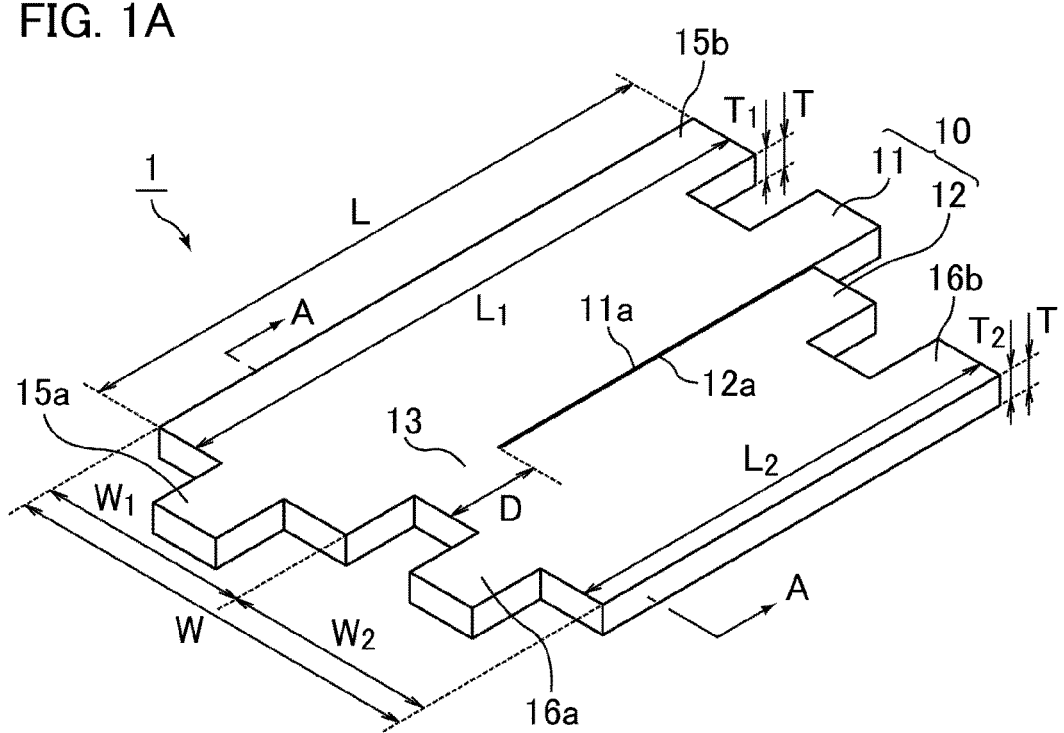
FIG. 1A illustrates a schematic perspective view of an example of the holding sealing material according to the first embodiment of the present invention.

The embodiments will now be described with reference to the accompanying drawings, wherein like reference numerals designate corresponding or identical elements throughout the various drawings.

The holding sealing material according to an embodiment of the present invention is a holding sealing material, including a one-sheet mat that includes inorganic fibers, the one-sheet mat including a first mat with a first side face, and a second mat with a second side face, wherein a part of the first side face and a part of the second side face are foldably and integrally connected.

The holding sealing material is formed of a one-sheet mat, and the one-sheet mat includes a first mat and a second mat. The first mat and the second mat are foldably connected.

Thus, the portion where the first mat and the second mat are connected can be folded to layer the first mat and the second mat, thereby providing a holding sealing material with plural layers of mats. The plural layers of mats increase the thickness of the holding sealing material to provide a holding sealing material with excellent thermal insulation performance.

A holding sealing material formed from the one-sheet mat can avoid layering mats with a wrong combination.

In the holding sealing material, the first mat and the second mat are connected at a part of the first side face and a part of the second side face. The first mat and the second mat are namely not entirely connected at a side face of each mat. In other words, the first mat and the second mat are partly separated at a side face of each mat.

If the portion where the first mat and the second mat are connected is part of a side face of each mat, the holding sealing material has no creases when wound around the exhaust gas treating body, thereby making winding easy.

The holding sealing material includes no other materials for fixing the mats, such as an adhesive material and machine sewing thread, in the portion where the first mat and the second mat are connected. The portion where the first mat and the second mat are connected only includes materials for integrally forming the first mat and the second mat. Thus, an increase of organic components in exhaust gases is suppressed when the holding sealing material is exposed to high temperatures in an exhaust gas purifying apparatus.

In the holding sealing material according to an embodiment of the present invention, a length of the first mat in a longitudinal direction is different from a length of the second mat in a longitudinal direction.

If the length of the first mat in the longitudinal direction is different from the length of the second mat in the longitudinal direction, the difference in periphery (the difference in length between an outer mat and an inner mat for winding the mats without gaps) is reduced when the holding sealing mat is wound around an exhaust gas treating body. Thereby, the exhaust gas treating body can be uniformly held at the entire periphery.

Also, when such a holding sealing material is wound around an exhaust gas treating body, the mat located outside can be prevented from having gaps at end portions to enhance the gas sealing property.

In the holding sealing material according to an embodiment of the present invention, a portion where the first mat and the second mat are foldably connected is provided in a direction parallel to a longitudinal direction of the first mat and a longitudinal direction of the second mat.

In the holding sealing material, when the portion where the first mat and the second mat are foldably connected is folded, the distance between the folded side face and the opposite side face is short. Thus, even if the folded line is slightly inclined against the longitudinal direction of the mats, the displacement between the mats can be small.

In the holding sealing material according to an embodiment of the present invention, the portion where the first mat and the second mat are foldably connected is $1/20$ to $1/3$ the length of the one-sheet mat in a longitudinal direction.

In the holding sealing material according to an embodiment of the present invention, the portion where the first mat and the second mat are foldably connected has a length of 5 to 150 mm.

If the portion where the first mat and the second mat are foldably connected has a length within the above range, the length of the portion where the first mat and the second mat are foldably connected is not too short, which prevents separation of the one-sheet mat by tearing. Also, the length of the portion where the first mat and the second mat are foldably connected is not too long, which reduces the elasticity caused by the difference in periphery when the holding sealing material is wound around an exhaust gas treating body, and thus achieves easy winding of the holding sealing material around an exhaust gas treating body.

In the holding sealing material according to an embodiment of the present invention, the portion where the first mat and the second mat are foldably connected is provided with a slit formed on at least one of a front face and a back face of the one-sheet mat in a thickness direction of the one-sheet mat.

In the holding sealing material according to an embodiment of the present invention, a depth of the slit is $1/5$ to $4/5$ a thickness of the one-sheet mat.

Forming the slit enables easy folding of the portion where the first mat and the second mat are connected. A slit being $1/5$ to $4/5$ the thickness of the one-sheet mat enables easy folding of the portion where the first mat and the second mat are connected, and prevents separation of the one-sheet mat by tearing.

In the holding sealing material according to an embodiment of the present invention, the first mat and the second mat each have a pair of fitting portions configured to fit to each other when the holding sealing material is wound around an exhaust gas treating body.

If the first mat and the second mat each have a pair of fitting portions, both ends of the first mat and the second mat fit to each other to stabilize the position of the holding sealing material.

In the holding sealing material according to an embodiment of the present invention, the pair of fitting portions of the first mat and the pair of fitting portions of the second mat each have a recessed portion and a projected portion, and arrangement of the recessed portion and projected portion of the first mat is different from arrangement of the recessed portion and projected portion of the second mat.

In the holding sealing material according to an embodiment of the present invention, when the holding sealing material is wound around a round pillar-shaped exhaust gas treating body, the pair of fitting portions of the first mat and the pair of fitting portions of the second mat satisfy a following formula (1) or (2), and the pair of fitting portions of the first mat and the pair of fitting portions of the second mat are located at different sites on an outer peripheral surface of the exhaust gas treating body, the formulas being:

when $a \geq b \times L_1/L_2$, $$(b+c) \times L_1/L_2 \leq a \leq (b-c+L_2) \times L_1/L_2 \quad (1)$$

when $a < b \times L_1/L_2$, $$(b+c-L_2) \times L_1/L_2 \leq a \leq (b-c) \times L_1/L_2 \quad (2)$$

a: distance from a "starting position of the projected portion" to a "center of a connected portion" of the first mat b: distance from a "starting position of the projected portion" to a "center of a connected portion" of the second mat c: length of the projected portion of each fitting portion $L_1$: length of the first mat in a longitudinal direction $L_2$: length of the second mat in a longitudinal direction.

When the pairs of fitting portions have a gap, the pairs of fitting portions have a portion with a lower surface pressure compared to portions other than the pairs of fitting portions in the holding sealing material. Providing pairs of fitting portions on locations represented by the formulas means that the pair of fitting portions of the first mat and the pair of fitting portions of the second mat are located at different sites when the holding sealing material is wound around an exhaust gas treating body. This positional relationship avoids overlapping of portions with a locally low surface pressure in the thickness direction of the holding sealing material. Thus, the holding sealing material can obtain uniformed surface pressure distribution.

In the holding sealing material according to an embodiment of the present invention, two or more of the portions where the first mat and the second mat are foldably connected are provided.

Two or more connected portions can prevent angle misalignment between the first mat and the second mat when the portions where the first mat and the second mat are foldably connected are folded. Thus, the first mat and the second mat can be layered with the first side face of the first mat and the second side face of the second mat located in parallel to each other.

In the holding sealing material according to an embodiment of the present invention, one of the portions where the first mat and the second mat are foldably connected is shorter and more scissile than the other connected portion or connected portions.

Such a holding sealing material can prevent angle misalignment between the first mat and the second mat when the portions where the first mat and the second mat are foldably connected are folded. In addition, the shorter and more scissile part of the portions where the first mat and the second mat are foldably connected can be cut in winding. Thereby, the elasticity caused by the difference in periphery when the holding sealing material is wound around is reduced, and thus the holding sealing material may be more easily wound around an exhaust gas treating body.

In the holding sealing material according to an embodiment of the present invention, the one-sheet mat has a thickness of 1.5 to 15 mm. A one-sheet mat having a thickness within the above range prevents separation of the one sheet mat by tearing when the portion where the first mat and the second mat are foldably connected is folded.

In the holding sealing material of the embodiment of the present invention, the one-sheet mat preferably has a weight per unit area of 400 to 2,000 g/cm².

A one-sheet mat having a weight per unit area within the above range can serve as a holding sealing material with excellent thermal insulation performance by layering the mats.

In the holding sealing material of the embodiment of the present invention, the one-sheet mat is preferably needle-punched.

A needle-punched one-sheet mat prevents separation of the one-sheet mat by tearing when the portion where the first mat and the second mat are foldably connected is folded.

If the direction of the needle-punching follows the folding direction, the needle-punched mat can be easily folded. In addition, different densities of needle-punching between the first mat and the second mat make folding easy. For example, the mat that is located outside when the needle-punched mats are wound around an exhaust gas treating body may have an increased density of needle-punching.

In the holding sealing material of the embodiment of the present invention, the inorganic fibers preferably have an average fiber length of 4 to 120 mm.

An average fiber length of the inorganic fibers within the above range can prevent separation of the first mat and the second mat by tearing when the portion where the first mat and the second mat are connected is folded.

In the holding sealing material according to an embodiment of the present invention, the one-sheet mat further includes identification information for identifying a folding direction on at least one surface.

Forming identification information prevents folding the portion, where the first mat and the second mat are connected, in a wrong direction.

In the holding sealing material of the embodiment of the present invention, the inorganic fibers are preferably made of low-crystalline alumina.

In the holding sealing material of the embodiment of the present invention, the inorganic fibers are preferably made of low-crystalline alumina having a mullite composition.

Inorganic fibers made of low-crystalline alumina are less likely to be broken when the portion where the first mat and the second mat are connected is folded. Inorganic fibers made of low-crystalline alumina having a mullite composition are much less likely to be broken when the portion where the first mat and the second mat are connected is folded.

In the holding sealing material according to an embodiment of the present invention, a length of the first mat in a width direction perpendicular to a longitudinal direction is different from a length of the second mat in a width direction perpendicular to a longitudinal direction.

In the holding sealing material according to an embodiment of the present invention, a difference between the length of the first mat in the width direction and the length of the second mat in the width direction is 10 mm or less.

The difference between the length of the first mat in the width direction and the length of the second mat in the width direction causes a level difference at an end portion of the holding sealing material when the holding sealing material is wound around an exhaust gas treating body. Stuffing the holding sealing material into a casing from the side with the level difference makes the stuffing easy. On the other hand, stuffing the holding sealing material into a casing from the side not having the level difference prevents the holding sealing material from protruding over an end portion of the casing after the stuffing.

The difference in the width direction is preferably 10 mm or less for favorably achieving the above effects.

The method for manufacturing a holding sealing material according to an embodiment of the present invention includes preparing a mat material including inorganic fibers; punching out a one-sheet mat including a first mat with a first side face and a second mat with a second side face from the mat material in such a manner that a part of the first side face and a part of the second side face are foldably and integrally connected; and layering the first mat and the second mat by folding a portion where the first mat and the second mat are connected.

The method for manufacturing a holding sealing material has no need for fixing plural mats and requires only punching out and layering for manufacturing a holding sealing material with plural layers of mats. Thereby, the number of the steps for manufacturing a holding sealing material with plural layers of mats can be reduced.

Also, since the first mat and the second mat are layered by folding the portion where the first mat and the second mat are connected, the mats can be prevented from being layered with a wrong combination.

In the method for manufacturing a holding sealing material of the embodiment of the present invention, the punching out is preferably carried out in such a manner that the portion where the first mat and the second mat are foldably connected is provided in a direction parallel to a longitudinal direction of the first mat and a longitudinal direction of the second mat.

If the portion where the first mat and the second mat are foldably connected is provided in a direction parallel to the longitudinal direction of the first mat and the longitudinal direction of the second mat, the distance between the folded side face and the opposite side face is short when the portion where the first mat and the second mat are connected is folded in layering. Thus, even if the folded line is slightly inclined against the longitudinal direction of the mats, the displacement between the mats can be small. As a result, a holding sealing material with a smaller displacement can be manufactured.

In the method for manufacturing a holding sealing material of the embodiment of the present invention, the punching out is preferably carried out in such a manner that the portion where the first mat and the second mat are foldably connected is $1/20$ to $1/3$ the length of the one-sheet mat in a longitudinal direction.

In the method for manufacturing a holding sealing material of the embodiment of the present invention, the punching out is preferably carried out in such a manner that the portion where the first mat and the second mat are foldably connected has a length of 5 to 150 mm.

The method for manufacturing a holding sealing material of the embodiment of the present invention preferably further includes forming a slit in the portion where the first mat and the second mat are foldably connected, the slit being formed on at least one of a front face and a back face of the one-sheet mat in a thickness direction of the one-sheet mat.

A one-sheet mat provided with a slit formed in the thickness direction achieves easy folding of the portion where the first mat and the second mat are connected in layering, to manufacture a holding sealing material.

In the method for manufacturing a holding sealing material of the embodiment of the present invention, forming the slit is preferably simultaneously carried out with the punching out.

This method enables forming a slit without increasing the number of the steps.

In the method for manufacturing a holding sealing material of the embodiment of the present invention, forming the slit is preferably carried out after the punching out.

Forming a slit after punching out enables fine adjustment of the depth and location of the slit.

In the method for manufacturing a holding sealing material of the embodiment of the present invention, forming the slit is preferably carried out in such a manner that a depth of the slit is $1/5$ to $4/5$ a thickness of the one-sheet mat.

In the method for manufacturing a holding sealing material of the embodiment of the present invention, in the punching out, a pair of fitting portions is preferably formed on each of the first mat and the second mat, the pair of fitting portions being configured to fit to each other when the holding sealing material is wound around an exhaust gas treating body.

In the method for manufacturing a holding sealing material of the embodiment of the present invention, in the punching out, the pair of fitting portions of the first mat and the second mat is preferably formed in such a manner that the pair of fitting portions have a recessed portion and a projected portion, and that arrangement of the recessed portion and projected portion of the first mat is different from arrangement of the recessed portion and projected portion of the second mat.

Here, a case where the front face and the back face of the mat material are different is considered. In this case, if the arrangement of the recessed portion and projected portion of the pair of fitting portions of the first mat is different from the arrangement of the recessed portion and projected portion of the pair of fitting portions of the second mat, the positional relationship among the portion where the first mat and the second mat are connected, the recessed portions, and the projected portions becomes always the same regardless of either side of the mat facing up. Thus, holding sealing materials having the same configuration can be manufactured from one mat material regardless of which face of the mat is the front face of the mat.

In the method for manufacturing a holding sealing material of the embodiment of the present invention, in the punching out, the mat material is preferably punched in such a manner that an end portion of the first mat in a longitudinal direction is located in line with an end portion of the second mat in a longitudinal direction.

The above method can achieve less waste of the mat material and enhance the yield of the material.

The method for manufacturing a holding sealing material of the embodiment of the present invention preferably further includes forming identification information for identifying a folding direction on at least one surface of the one-sheet mat.

Forming identification information enables to prevent folding the portion, where the first mat and the second mat are connected, in a wrong direction, thereby improving the productivity of the holding sealing material.

In the method for manufacturing a holding sealing material of the embodiment of the present invention, the forming identification information is preferably carried out before the punching out.

Confirming the direction of folding the portion where the first mat and the second mat are connected and then forming the identification information before punching out can prevent the portion where the first mat and the second mat are connected from being folded in a wrong direction even after punching out among many mats, in which some of punched mats have the front faces facing up and others have the back faces facing up.

In the method for manufacturing a holding sealing material of the embodiment of the present invention, two or more of the portions where the first mat and the second mat are foldably connected are preferably provided in the punching out.

In the method for manufacturing a holding sealing material of the embodiment of the present invention, the punching out is preferably carried out in such a manner that one of the portions where the first mat and the second mat are foldably connected is shorter and more scissile than the other connected portion or connected portions.

A holding sealing mat having two or more of the portions where the first mat and the second mat are foldably connected can prevent angle misalignment of the first mat and the second mat when the portions where the first mat and the second mat are connected are folded. Thus, the first mat and the second mat can be layered with the first side face of the first mat and the second side face of the second mat aligned in parallel to each other.

The exhaust gas purifying apparatus according to an embodiment of the present invention includes an exhaust gas treating body, a casing accommodating the exhaust gas treating body, and a holding sealing material wound around the exhaust gas treating body and placed between the exhaust gas treating body and the casing, the holding sealing material including a one-sheet mat that includes inorganic fibers, the one-sheet mat including a first mat with a first side face and a second mat with a second side face, a part of the first side face and a part of the second side face being foldably and integrally connected, the holding sealing material being placed between the exhaust gas treating body and the casing in such a manner that a portion where the first mat and the second mat are foldably connected is folded at to layer the first mat and the second mat.

This exhaust gas purifying apparatus includes a thick holding sealing material in which the first mat and the second mat are layered, thereby achieving excellent performance for thermal insulating the exhaust gas treating body.

Also, the holding sealing material includes no organic components, such as machine sewing thread and an adhesive material, for fixing plural mats, thereby reducing organic components in exhaust gases.

The method for manufacturing an exhaust gas purifying apparatus according to an embodiment of the present invention includes: providing a holding sealing material, the holding sealing material including a one-sheet mat that includes inorganic fibers, the one-sheet mat including a first mat with a first side face and a second mat with a second side face, a part of the first side face and a part of the second side face being foldably and integrally connected, the holding sealing material being provided by folding a portion where the first mat and the second mat are foldably connected to layer the first mat and the second mat; winding the holding sealing material around an exhaust gas treating body; and accommodating the exhaust gas treating body wound with the holding sealing material in a casing.

This method enables to reduce the number of steps for manufacturing a holding sealing material in which a first mat and a second mat are layered, and to manufacture the holding sealing material without layering mats with a wrong combination.

Thus, an exhaust gas purifying apparatus including a holding sealing material having plural layers of mats can be produced in fewer steps at a high yield.

The holding sealing material according to an embodiment of the present invention includes a one-sheet mat that includes inorganic fibers, the one-sheet mat including a first rectangular mat being substantially rectangular in a plan view, and a second rectangular mat being substantially rectangular in a plan view and integrally connected to the first rectangular mat, wherein a border line between the first rectangular mat and the second rectangular mat is part of a side of a rectangle of the first rectangular mat in a plan view and part of a side of a rectangle of the second rectangular mat in a plan view, and the first rectangular mat and the second rectangular mat are configured to be layered by folding the one-sheet mat along the border line.

Hereinafter, embodiments of the present invention are specifically described. The present invention is, however, not limited to the following embodiments. Appropriate changes may be made unless the gist of the present invention is changed.

(First Embodiment)

The following describes a first embodiment that includes an embodiment of the holding sealing material, the method for manufacturing the holding sealing material, the exhaust gas purifying apparatus, and the method for manufacturing the exhaust gas purifying apparatus.

First, the holding sealing material according to the first embodiment of the present invention will be described.

A holding sealing material according to the first embodiment of the present invention is formed of a one-sheet mat that includes inorganic fibers. The one-sheet mat includes a first mat with a first side face and a second mat with a second side face. A part of the first side face and apart of the second side face are foldably and integrally connected.

FIG. 1A illustrates a schematic perspective view of an example of the holding sealing material according to the first embodiment of the present invention.

Figure 1B:
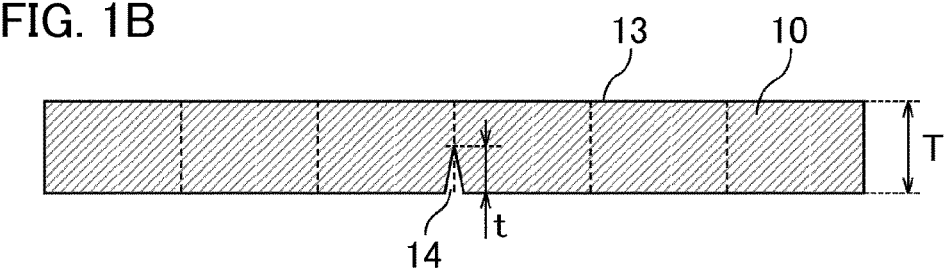
FIG. 1B illustrates an A-A line cross-sectional view of the holding sealing material illustrated in FIG. 1A.

FIG. 1B illustrates an A-A line cross-sectional view of the holding sealing material illustrated in FIG. 1A.

Figure 1C:
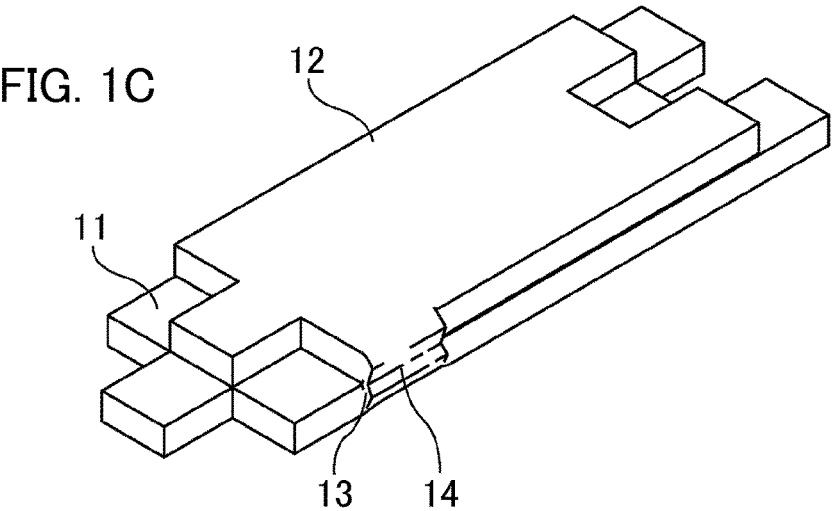
FIG. 1C illustrates a schematic perspective view of the holding sealing material illustrated in FIG. 1A, in which the portion where the first mat and the second mat are connected is folded to layer the first mat and the second mat.

FIG. 1C illustrates a schematic perspective view of the holding sealing material illustrated in FIG. 1A, in which the portion where the first mat and the second mat are connected is folded to layer the first mat and the second mat.

The holding sealing material 1 of the present embodiment illustrated in FIG. 1A is formed of a one-sheet mat 10 including inorganic fibers.

The one-sheet mat 10 includes a first mat 11 and a second mat 12.

The first mat 11 and the second mat 12 each have a predetermined length in the longitudinal direction, a predetermined width, a predetermined thickness, and a substantially rectangular shape in a plan view. Hereinafter, a mat with a substantially rectangular shape in a plan view such as the first mat 11 or the second mat 12 is also referred to as a rectangular mat.

The first mat 11 has a length $L_1$ in the longitudinal direction, a width $W_1$, and a thickness $T_1$.

Among the side faces of the first mat 11, the side face facing to the second mat 12 is defined as a first side face 11a.

In the present embodiment, the first side face 11a is provided in the parallel direction to the longitudinal direction (the direction indicated by the double-headed arrow $L_1$) of the first mat 11.

The second mat 12 has a length $L_2$ in the longitudinal direction, a width $W_2$, and a thickness $T_2$.

Among the side faces of the second mat 12, the side face facing to the first mat 11 is defined as a second side face 12a.

In the present embodiment, the second side face 12a is provided in the parallel direction to the longitudinal direction (the direction indicated by the double-headed arrow $L_2$) of the second mat 12.

The length $L_2$ of the second mat 12 in the longitudinal direction is shorter than the length $L_1$ of the first mat 11 in the longitudinal direction.

In other words, the length $L_1$ of the first mat 11 in the longitudinal direction is different from the length $L_2$ of the second mat 12 in the longitudinal direction.

The width $W_2$ and the thickness $T_2$ of the second mat 12 equal to the width $W_1$ and the thickness $T_1$ of the first mat 11, respectively.

The first mat 11 and the second mat 12 are partly integrally connected. A portion 13 where the first mat 11 and the second mat 12 are connected is a part of the first side face 11a and a part of the second side face 12a.

Hereinafter, the portion where the first mat and the second mat are foldably connected is also referred to as a connected portion.

Since the first mat 11 and the second mat 12 are connected at the connected portion 13, the mat 10 is, when seen as a whole, a one-sheet mat including the first mat 11 and the second mat 12.

In other words, the mat 10 is a one-sheet mat including two rectangular mats.

The length of the one-sheet mat 10 in the longitudinal direction is the length indicated by L in FIG. 1A. The length of a one-sheet mat in the longitudinal direction is herein defined as the longest length of the lengths of rectangular mats in the longitudinal direction in the one-sheet mat. In FIG. 1A, the length L of the one-sheet mat 10 in the longitudinal direction equals to the length $L_1$ of the first mat 11 in the longitudinal direction.

The width of the one-sheet mat 10 corresponds to the length indicated by W in FIG. 1A. The width of a one-sheet mat is herein defined as the total length of the widths of rectangular mats included in the one-sheet mat. In FIG. 1A, the width W of the one-sheet mat 10 equals to the total length of the width $W_1$ of the first mat 11 and the width $W_2$ of the second mat 12.

The thickness of the one-sheet mat 10 is the length indicated by T in FIG. 1A. The thickness of a one-sheet mat herein usually equals to the thickness of each rectangular mat included in the one-sheet mat. In FIG. 1A, the thickness T of the one-sheet mat 10 equals to each of the thickness $T_1$ of the first mat 11 and the thickness $T_2$ of the second mat 12.

The thickness T of the one-sheet mat of the holding sealing material of the present embodiment is preferably 1.5 to 15 mm.

The length of the portion 13 where the first mat 11 and the second mat 12 are foldably connect is the length indicated by D in FIG. 1A.

In the holding sealing material of the present embodiment, the length D of the portion 13 where the first mat 11 and the second mat 12 are foldably connect is preferably 1/20 to 1/3 the length L of the one-sheet mat 10 in the longitudinal direction.

In addition, the length D of the portion 13 where the first mat 11 and the second mat 12 are foldably connect is preferably 5 to 10 mm.

The first mat 11 and the second mat 12 each have a pair of fitting portions.

The first mat 11 includes a projected portion 15a at one end portion and a recessed portion 15b at the other end portion. The pair of fitting portions of the first mat 11 consists of the projected portion 15a and the recessed portion 15b.

The second mat 12 includes a projected portion 16a at one end portion and a recessed portion 16b at the other end portion. The pair of fitting portions of the second mat 12 consists of the projected portion 16a and the recessed portion 16b.

When the holding sealing material 10 is wound around an exhaust gas treating body to form an exhaust gas purifying apparatus that will be described later, the projected portion 15a and the recessed portion 15b of the first mat 11 fit to each other, and the projected portion 16a and the recessed portion 16b of the second mat 12 fit to each other.

In the holding sealing material of the present embodiment, the one-sheet mat forming the holding sealing material is preferably a needle-punched mat obtained by needle-punching abase mat made of inorganic fibers. The needle-punching refers to a process in which a fiber entangling means such as a needle is inserted into and removed from the base mat.

In the one-sheet mat 10 forming the holding sealing material 1 illustrated in FIG. 1A, inorganic fibers with a comparatively long average fiber length are three-dimensionally entangled with one another by needle-punching. The one-sheet mat 10 is needle-punched in the width direction perpendicular to the longitudinal direction.

The inorganic fibers have a certain average fiber length to form an entangled structure, and preferably have an average fiber length of 4 to 120 mm, for example.

The one-sheet mat 10 preferably has a weight per unit area of 400 to 2,000 $g/cm^2$.

The inorganic fibers of the one-sheet mat are not particularly limited, and may be alumina-silica fibers, alumina fibers, silica fibers, or the like. The inorganic fibers may also be glass fibers. Appropriate fibers maybe selected depending on required properties for the holding sealing material, such as heat resistance and wind erosion-resistance.

Among these, inorganic fibers made of low-crystalline alumina are preferable, and inorganic fibers made of low-crystalline alumina having a mullite composition are more preferable.

FIG. 1B illustrates an A-A line cross-sectional view of the holding sealing material illustrated in FIG. 1A.

As illustrated in FIG. 1B, the portion 13 where the first mat and the second mat are foldably connected is provided with a slit 14 in the thickness direction of the one-sheet mat 10.

In the holding sealing material of the present embodiment, the depth "t" of the slit 14 is 1/5 to 4/5 the thickness T of the one-sheet mat 10.

FIG. 1C illustrates a schematic perspective view of the holding sealing material illustrated in FIG. 1A, in which the portion where the first mat and the second mat are connected is folded to layer the first mat and the second mat.

As illustrated in FIG. 1C, the connected portion 13 is folded to layer the second mat 12 on the first mat 11, thereby forming a layered mat.

Folding the connected portion 13 in the direction such that the slit 14 spreads out enables easy folding.

The folding direction of the connected portion 13 is not particularly limited, and the connected portion 13 may be folded in the opposite direction from the direction that the slit 14 spreads out, to form a layered mat.

The one-sheet mat preferably includes identification information for identifying the folding direction on at least one surface of the one-sheet mat.

The identification information can be formed by printing by ink-jet, or marking with an oil-based marker, a tape, or the like. Examples of the expression for the identification information include "Inside" and "Outside". The identification information may include other information that is at least one selected from product name, product number, manufacturing number, class, weight, size, applicable car models, notes, contact address, and corporation name. The letters for writing the identification information are preferably at least one selected from the Roman alphabet, numbers, Chinese characters, Hiragana, Katakana, symbols, and dots.

If the connected portion is provided with a slit, the holding sealing material is usually folded in the direction that the slit spreads out. Thus, a sign such as "This side has a slit." can also be deemed as the identification information.

Next, the method for manufacturing the holding sealing material according to the first embodiment of the present invention will be described.

The method for manufacturing the holding sealing material according to the first embodiment of the present invention includes preparing a mat material including inorganic fibers; punching out a one-sheet mat including a first mat with a first side face and a second mat with a second side face from the mat material in such a manner that the first mat and the second mat are foldably connected at a part of the first side face and a part of the second side face; and layering the first mat and the second mat by folding a portion where the first mat and the second mat are connected.

First, a mat material with a predetermined size is prepared.

The mat material is formed by the mentioned needle-punching of a base mat material. In a base mat material, inorganic fibers are loosely entangled through a spinning process. These loosely entangled inorganic fibers are needle-punched to be more intricately entangled with one another, thereby forming a mat having an entangled structure.

To the mat material, a binder may be applied as needed. Applying a binder to the mat material can reinforce the entangled structure of the inorganic fibers and suppress the volume of the mat.

The binder may be an emulsion prepared by dispersing acrylic based latex, rubber based latex, or the like in water. The binder is uniformly and entirely sprayed on the mat material using a means such as a spray, whereby the binder adheres to the mat material.

Then, the mat material is dried to remove the water in the binder. The mat material may be dried, for example, at 95° C. to 150° C. for 1 to 30 minutes. The mat material is prepared through the drying.

Before punching out, identification information is preferably formed on the mat material. The identification information may be formed, for example, by ink-jet printing. Forming identification information on one face of the mat material before punching out enables to distinguish the front face and the back face of a one-sheet mat after punching out and to prevent the connected portion from being folded in a wrong direction.

Next, punching out is carried out.

Figure 2:
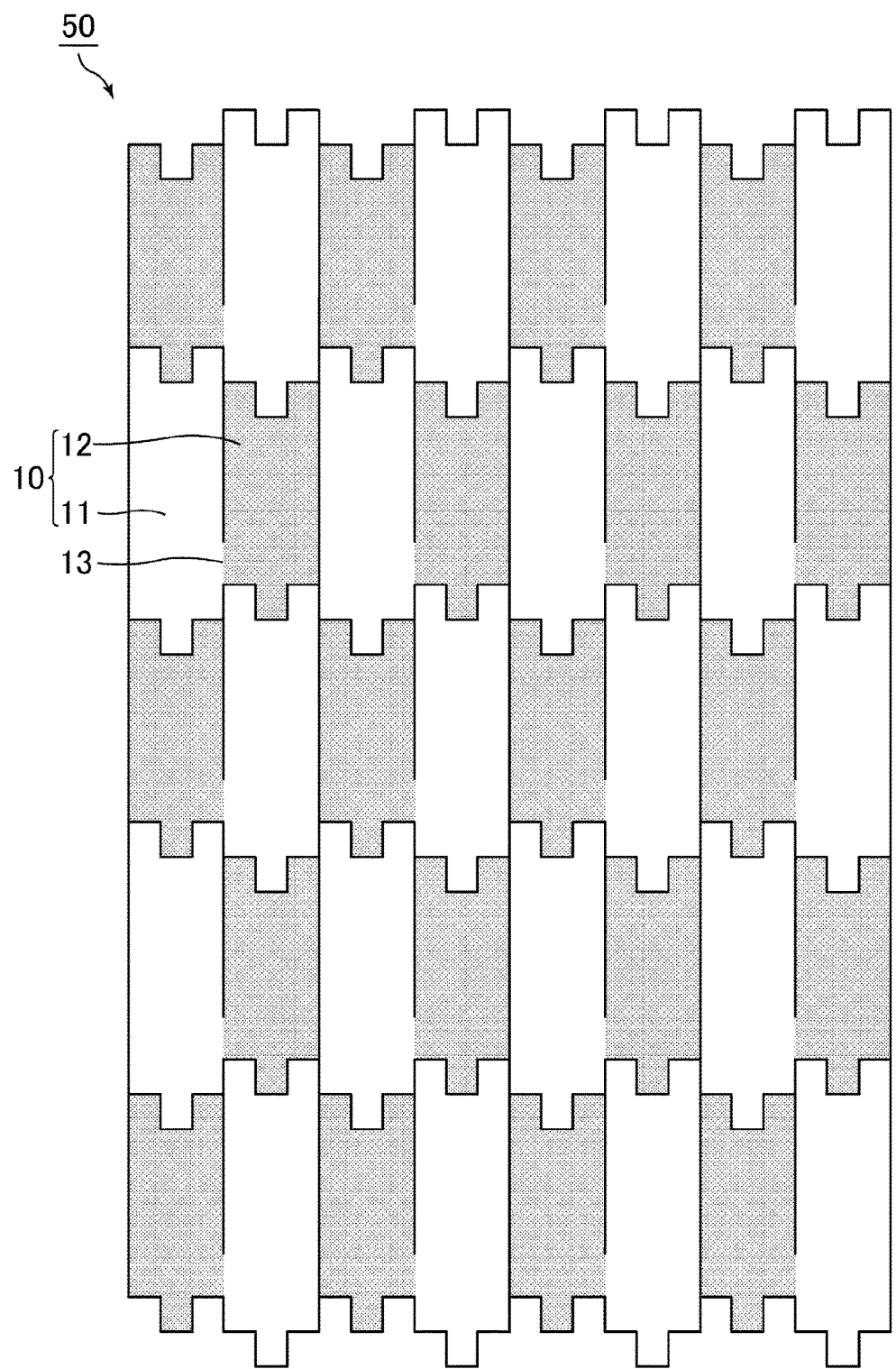
FIG. 2 illustrates a schematic plan view of a pattern for punching out the mats of the first embodiment of the present invention from a mat material.

FIG. 2 illustrates a schematic plan view of a pattern for punching out the mats of the first embodiment of the present invention from a mat material.

A mat material 50 illustrated in FIG. 2 has a sufficient area for punching out plural one-sheet mats 10 according to the present embodiment. The mat material is cut along the full lines illustrated in FIG. 2, thereby forming one-sheet mats 10 in which a first mat 11 and a second mat 12 are connected.

Since the shapes of the first mat 11 and the second mat 12 have been already stated above, the detailed explanation thereof will be omitted.

In FIG. 2, the second mats 12 are illustrated by a mesh pattern.

The mat material maybe punched out by any known method using any known apparatus.

For example, a Thomson blade having the pattern as illustrated by the full lines in FIG. 2 may be used as a punching blade, and a hydraulic press machine may be used as a punching apparatus.

The method for forming a portion 13 (connected portion) where the first mat 11 and the second mat 12 are foldably connect may be, for example, making part of the Thomson blade discontinuous.

The method also maybe punching out only the peripheral part of the one-sheet mat 10 by a Thomson blade, and then cutting the mat along the border line with a cutter knife, excepting the part for a connected portion between the first mat 11 and the second mat 12.

A slit may be formed in the connected portion before, after, or during punching out.

If a slit is formed during punching out, a Thomson blade with a level difference may be used: the Thomson blade is prepared to have a shallower blade at the part for forming the connected portion. Thereby, when the part of the blade for cutting the mat material penetrates the mat material, the part of the blade for forming a connected portion cuts halfway through the mat material in the thickness direction.

If a slit is formed before or after punching out, the part for a connected portion of the one-sheet mat 10 may be cut halfway through in the thickness direction with a cutter knife to form a slit before or after punching out only the part for the peripheral part of the one-sheet mat 10 with a Thomson blade.

These methods enable adjusting the depth of the slit by adjusting the length of the blade at the part for forming a connected portion or adjusting the depth of the slit to be cut with a cutter knife.

The pattern of the Thomson blade for punching out may be changed to determine the dimensions of the first mat and the second mat, the location and the dimensions of the connected portion, the dimensions of the fitting portions, and the like.

Then, the one-sheet mat obtained through the above steps is exposed to layering by folding the portion where the first mat and the second mat are connected to layer the first mat and the second mat.

Through these steps, a holding sealing material in which a first mat and a second mat are layered can be manufactured.

Next, the exhaust gas purifying apparatus according to the first embodiment of the present invention will be described.

The exhaust gas purifying apparatus according to the first embodiment of the present invention includes an exhaust gas treating body, a casing accommodating the exhaust gas treating body, and a holding sealing material wound around the exhaust gas treating body and placed between the exhaust gas treating body and the casing. The holding sealing material includes a one-sheet mat that includes inorganic fibers. The one-sheet mat includes a first mat with a first side face and a second mat with a second side face. A part of the first side face and apart of the second side face are foldably and integrally connected. The holding sealing material is placed between the exhaust gas treating body and the casing in such a manner that a portion where the first mat and the second mat are foldably connected is folded to layer the first mat and the second mat.

An example of the exhaust gas purifying apparatus using the holding sealing material of the present embodiment will be described below with reference to FIG. 3A and FIG. 3B.

Figure 3A:
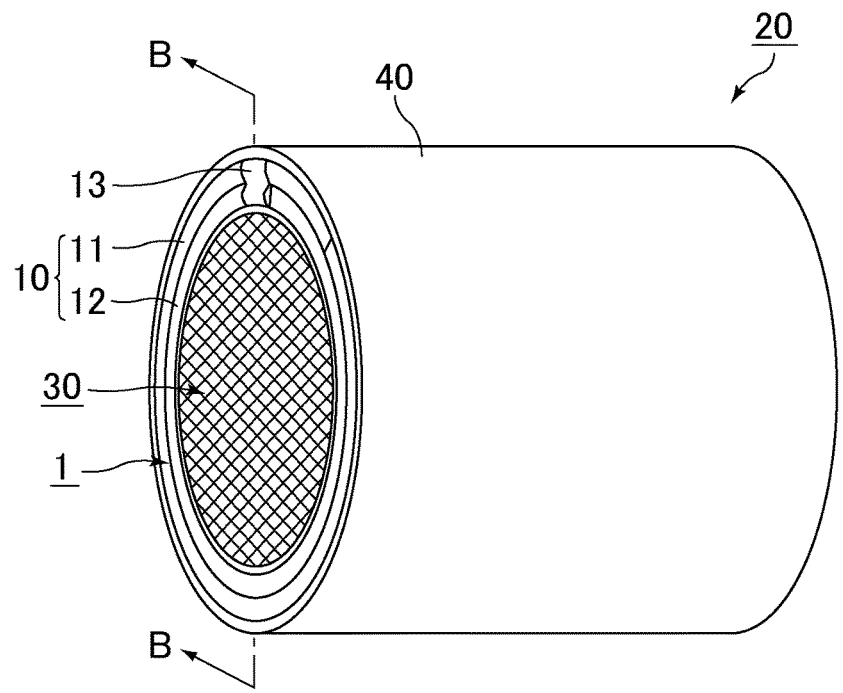
FIG. 3A illustrates a schematic perspective view of an example of an exhaust gas purifying apparatus.

FIG. 3A illustrates a schematic perspective view of an example of an exhaust gas purifying apparatus. FIG. 3B illustrates a B-B line cross-sectional view of the exhaust gas purifying apparatus illustrated in FIG. 3A.

Figure 3B:
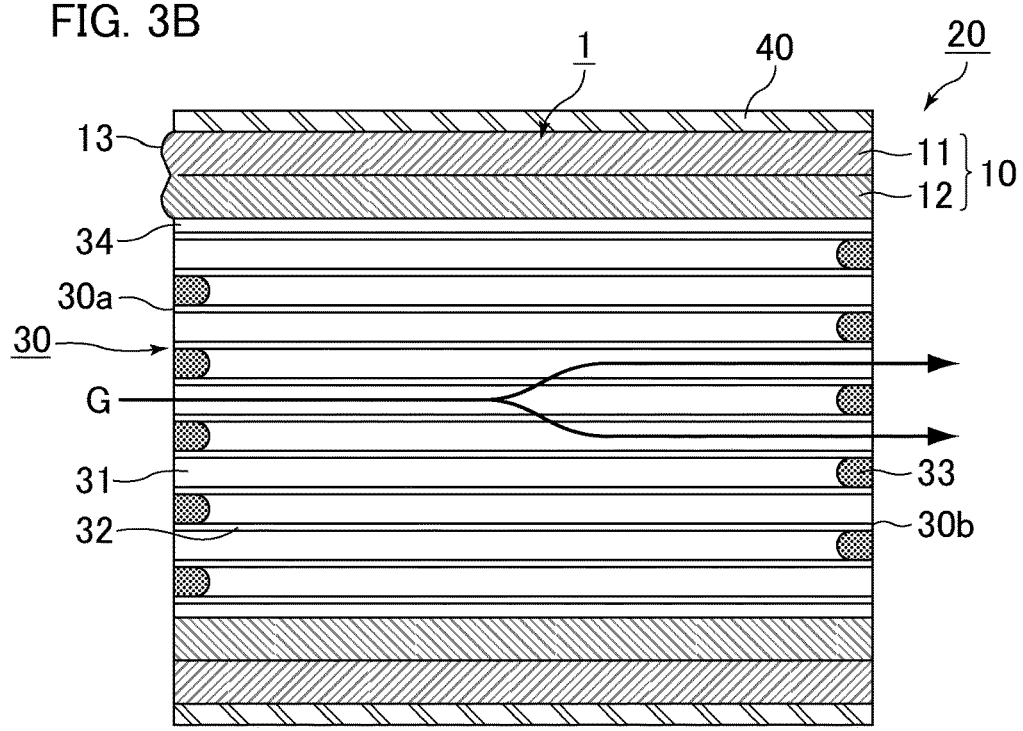
FIG. 3B illustrates a B-B line cross-sectional view of the exhaust gas purifying apparatus illustrated in FIG. 3A.

As illustrated in FIG. 3A and FIG. 3B, an exhaust gas purifying apparatus 20 includes a pillar-shaped exhaust gas treating body 30 in which a plurality of cells 31 are placed in parallel with one another in the longitudinal direction; a casing 40 accommodating the exhaust gas treating body 30; and a holding sealing material 1 that is placed between the exhaust gas treating body 30 and the casing 40 and holds the exhaust gas treating body 30.

The holding sealing material 1 is formed by folding the connected portion 13 to layer the first mat 11 and the second mat 12 of the one-sheet mat 10. The holding sealing material 1 is wound around the exhaust gas treating body 30 in such a manner that the first mat 11 is located outside and the second mat 12 is located inside.

End portions of the casing 40 are to be optionally connected to an inlet pipe introducing exhaust gases from internal combustion engines and to an outlet pipe discharging exhaust gases that have been passed through the exhaust gas purifying apparatus to the outside.

In the exhaust gas purifying apparatus 20, a honeycomb filter 30 is employed as the exhaust gas treating body 30, in which either one of the end portions of each cell is sealed with a plug 33 as illustrated in FIG. 3B.

The following will discuss the case where exhaust gases pass through the exhaust gas purifying apparatus 20 having the above-mentioned configuration with reference to FIG. 3B.

As illustrated in FIG. 3B, the exhaust gases (in FIG. 3B, the exhaust gases are indicated by G and the flow of the exhaust gases is indicated by arrows) discharged from the internal combustion engines and introduced into the exhaust gas purifying apparatus 20 flows into one cell 31 that is opened at an end face 30*a* of the exhaust gas inlet side in the honeycomb filter 30, and pass through a cell wall 32 separating the cell 31. At this time, PMs in the exhaust gases are captured in the cell wall 32, and as a result, the exhaust gases are purified. The purified exhaust gases flow out through another cell 31 that is opened at an end face 30*b* of the exhaust gas outlet side, and are discharged to the outside.

Figure 4A:
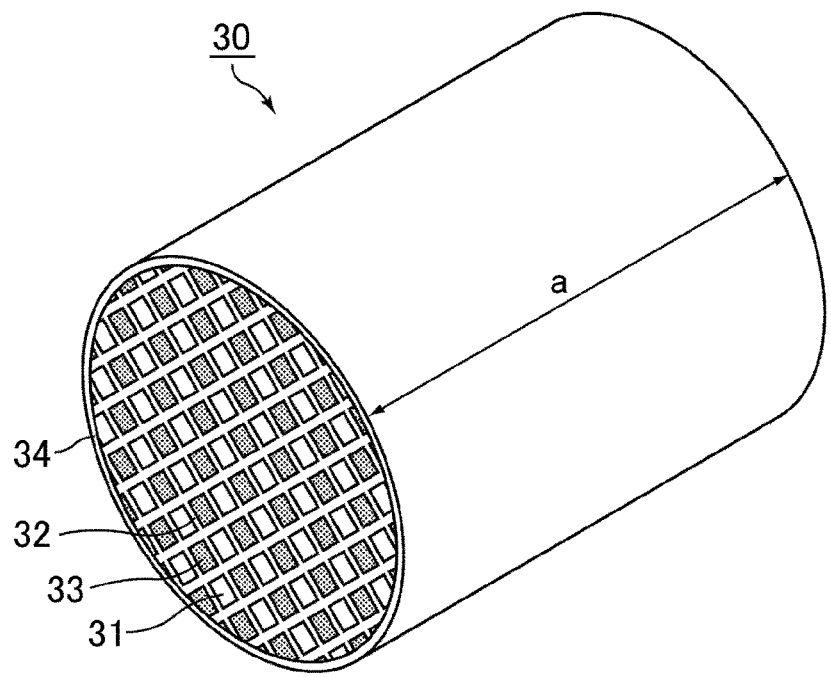
FIG. 4A illustrates a schematic perspective view of an example of a honeycomb filter.
Figure 4B:
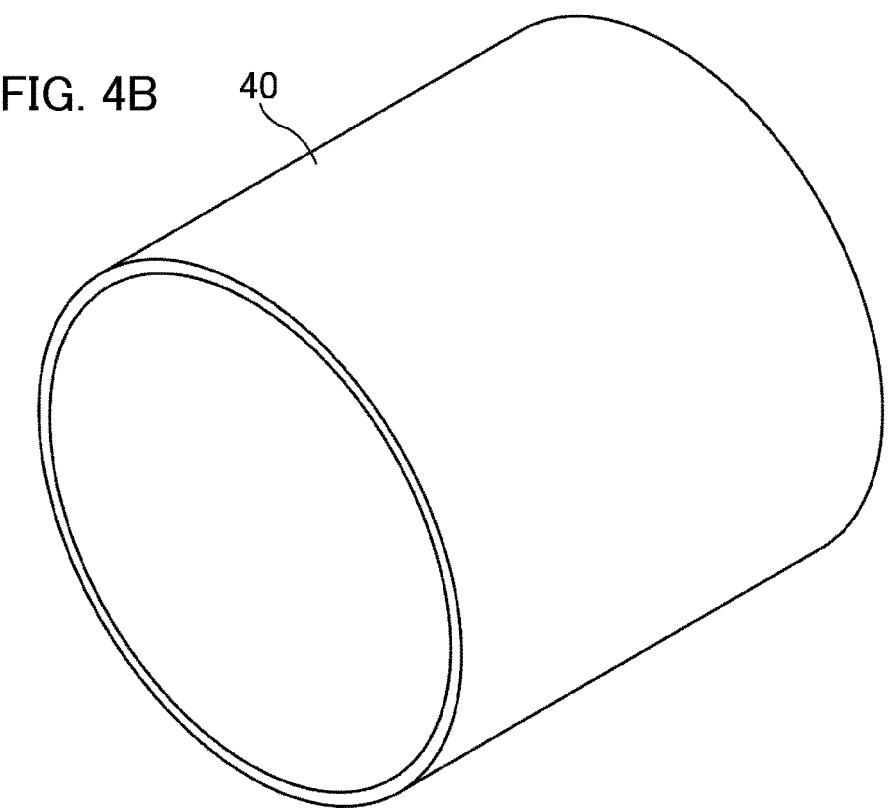
FIG. 4B illustrates a schematic perspective view of an example of a casing.

The following will discuss a honeycomb filter and a casing that form the exhaust gas purifying apparatus 20 with reference to FIG. 4A and FIG. 4B.

Here, the explanation of the configuration of the holding sealing material 1 will be omitted because it has been already stated.

FIG. 4A illustrates a schematic perspective view of an example of a honeycomb filter. FIG. 4B illustrates a schematic perspective view of an example of a casing.

As illustrated in FIG. 4A, a honeycomb filter 30 is mainly formed from porous ceramic and has a round pillar shape. A sealing material layer 34 is formed on the periphery of the honeycomb filter 30 for reinforcing the peripheral portion of the honeycomb filter 30, adjusting the shape of the peripheral portion thereof, and improving the thermal insulating performance of the honeycomb filter 30.

The internal configuration of the honeycomb filter 30 has been already described in the description of the exhaust gas purifying apparatus of the present embodiment (refer to FIG. 3B).

Next, the casing 40 will be described. The casing 40, illustrated in FIG. 4B, is mainly made of a metal such as stainless, and has a cylinder shape. The inner diameter thereof is slightly shorter than the total length of the diameter of an end face of the honeycomb filter 30 and the thickness of the holding sealing material 1 wound around the honeycomb filter 30. The length of the casing is substantially the same as the length of the honeycomb filter 30 in the longitudinal direction (direction indicated by the arrow "a" in FIG. 4A).

Here, the thickness of the holding sealing material used for defining the inner diameter of the casing refers to the thickness of the layered holding sealing material (total thickness of the first mat and the second mat).

Next, the method for manufacturing the exhaust gas purifying apparatus will be described with reference to figures.

The method for manufacturing the exhaust gas purifying apparatus according to the first embodiment of the present invention includes: providing a holding sealing material, the holding sealing material including a one-sheet mat that includes inorganic fibers, the one-sheet mat including a first mat with a first side face and a second mat with a second side face, a part of the first side face and a part of the second side face being foldably and integrally connected, the holding sealing material being provided by folding a portion where the first mat and the second mat are connected to layer the first mat and the second mat; winding the holding sealing material around an exhaust gas treating body; and accommodating the exhaust gas treating body wound with the holding sealing material in a casing.

Figure 5:
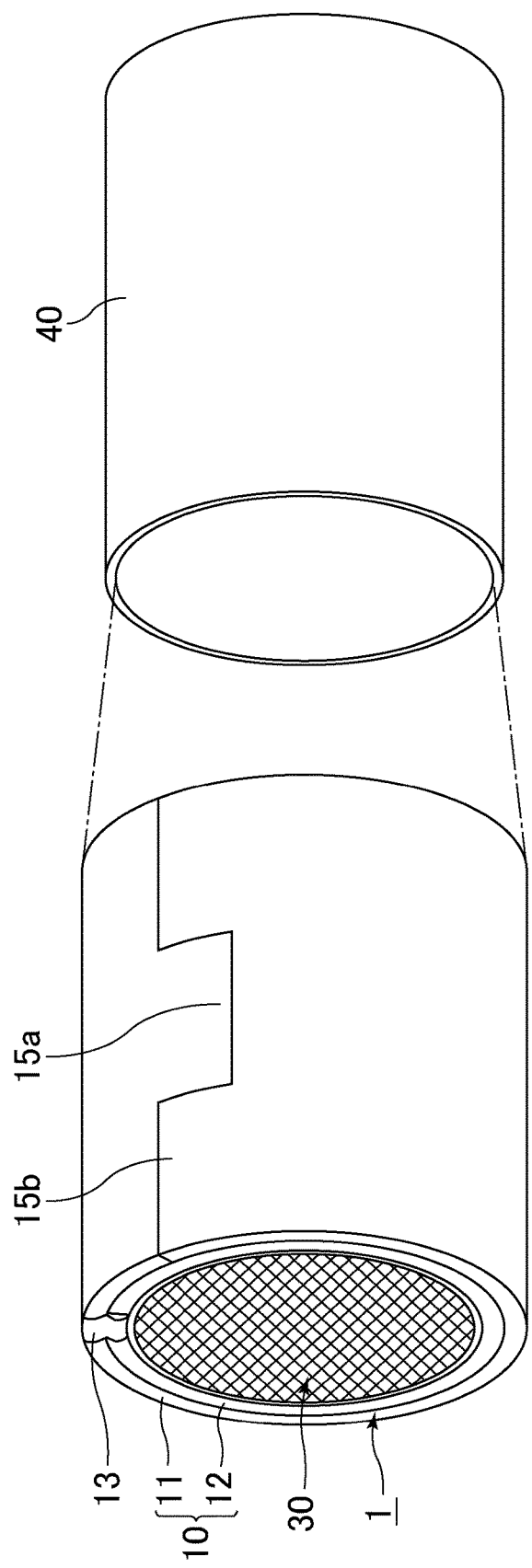
FIG. 5 illustrates a schematic perspective view of a procedure of manufacturing an exhaust gas purifying apparatus.

FIG. 5 illustrates a schematic perspective view of a procedure of manufacturing an exhaust gas purifying apparatus.

The holding sealing material 1 formed by layering the first mat 11 and the second mat 12, which is manufactured through the above steps, is wound on the periphery of the round pillar-shaped honeycomb filter 30 manufactured by a known method in such a manner that the projected portion 15*a* of the first mat 11 fits to the recessed portion 15*b* thereof and that the projected portion 16*a* of the second mat 12 fits to the recessed portion 16*b* thereof (refer to FIG. 1A). Then, as illustrated in FIG. 5, the exhaust gas treating body 30 wound with the holding sealing material 1 is stuffed into the casing 40 that is mainly made of a metal and the like and has a predetermined size and a cylinder shape, thereby manufacturing the exhaust gas purifying apparatus 20.

The inner diameter of the casing 40 is designed to be slightly smaller than the outermost diameter of the honeycomb filter 30 wound with the holding sealing material 1. The outermost diameter of the honeycomb filter 30 includes the thickness of the holding sealing material 1. Thereby, the holding sealing material 1 is compressed to exert a predetermined repulsive force (that is, a force for holding the exhaust gas treating body) after the stuffing.

The method of accommodating the exhaust gas treating body wound with the holding sealing material in a casing is not limited to a stuffing method, and may be a sizing method (swaging method) or a clam shell method.

In the sizing method (swaging method), the exhaust gas treating body wound with the holding sealing material is inserted into a casing and then compressed by pressures applied from the outer periphery of the casing to reduce the inner diameter of the casing. In the clam shell method, a casing is made separable into two parts of a first casing and a second casing. The exhaust gas treating body wound with the holding sealing material is placed on the first casing and covered with the second casing to be sealed.

Among the methods of accommodating the exhaust gas treating body wound with the holding sealing material in a casing, the stuffing method or the sizing method (swaging method) are preferable. This is because the stuffing method and sizing method (swaging method) have no need for preparing a casing with two parts, whereby the number of manufacturing steps can be reduced.

The following lists the effects achieved by the holding sealing material, the method for manufacturing the holding sealing material, the exhaust gas purifying apparatus, and the method for manufacturing the exhaust gas purifying apparatus according to the first embodiment of the present invention.

(1) The holding sealing material of the present embodiment includes a one-sheet mat, and the one-sheet mat includes a first mat and a second mat. The first mat and the second mat are foldably and integrally connected.

Thus, a portion where the first mat and the second mat are foldably connected can be folded to layer the first mat and the second mat, thereby manufacturing a holding sealing material with plural layers of mats. The plural layers of mats increase the thickness of the holding sealing material to impart high thermal insulation performance to a holding sealing material.

The configuration that the holding sealing material as a whole is formed of a one-sheet mat prevents mats from being layered with a wrong combination.

(2) In the holding sealing material of the present embodiment, the first mat and the second mat are connected at a part of the first side face and a part of the second side face. This means not that the connected portion covers an entire side face of the first mat and the second mat, but that a separated portion where the mat is cut is provided between the side faces of the first mat and the second mat.

If the portion where the first mat and the second mat are connected is part of a side face of each mat, the holding sealing material has no creases when wound around an exhaust gas treating body, thereby achieving easy winding.

(3) The holding sealing material of the present embodiment includes no other material for fixing mats, such as an adhesive material and machine sewing thread, at the portion where the first mat and the second mat are connected. The portion where the first mat and the second mat are connected includes only the materials for integrally forming the first mat and the second mat. Thereby, an increase of organic components in exhaust gases when the holding sealing material is exposed to high temperatures in an exhaust gas purifying apparatus can be suppressed.

(4) The method for manufacturing the holding sealing material according to the present embodiment includes preparing a mat material including inorganic fibers; punching out a one-sheet mat including a first mat with a first side face and a second mat with a second side face from the mat material in such a manner that a part of the first side face and a part of the second side face are foldably and integrally connected; and layering the first mat and the second mat by folding a portion where the first mat and the second mat are connected.

The method for manufacturing the holding sealing material has no need for fixing plural mats, and manufactures a holding sealing material with plural layers of mats by punching out and layering. Thus, this method reduces the number of the steps for manufacturing the holding sealing material with plural layers of mats.

In addition, since layering is carried out by folding the portion where the first mat and the second mat are connected, the mats can be prevented from being layered with a wrong combination.

(5) In the holding sealing material of the present embodiment, the length of the first mat in the longitudinal direction is different from the length of the second mat in the longitudinal direction. The configuration that the length of the first mat in the longitudinal direction is different from the length of the second mat in the longitudinal direction reduces the difference in periphery (the difference in length between an outer mat and an inner mat for winding without gaps) to uniformly hold the entire periphery of the exhaust gas treating body.

This configuration also prevents a mat, which is to be located outside when the holding sealing material is wound around an exhaust gas treating body, from having gaps at end portions, thereby enhancing the gas sealing property.

(6) In the holding sealing material of the present embodiment and the method for manufacturing the holding sealing material of the present embodiment, the portion where the first mat and the second mat are foldably connected is located in parallel to the longitudinal direction of the first mat and the longitudinal direction of the second mat.

In the holding sealing material, when the portion where the first mat and the second mat are foldably connected is folded, the distance between the folded side face and the opposite side face is short. Thus, even if the folding line is slightly inclined against the longitudinal direction of each mat, the displacement between the mats can be small. Thereby, a holding sealing material with a small displacement can be manufactured.

(7) In the holding sealing material of the present embodiment and the method for manufacturing the holding sealing material of the present embodiment, the length of the portion where the first mat and the second mat are foldably connected is preferably $1/20$ to $1/3$ the length of the one-sheet mat in the longitudinal direction. Additionally, the length of the portion where the first mat and the second mat are foldably connected is preferably 5 to 150 mm.

If the portion where the first mat and the second mat are connected has a length within the above range, the length of the portion where the first mat and the second mat are connected is not too short, which prevents separation of the one-sheet mat by tearing. Also, the length of the portion where the first mat and the second mat are connected is not too long, which reduces the elasticity caused by the difference in periphery when the holding sealing material is wound around an exhaust gas treating body. Thereby, the holding sealing material can be easily wound around an exhaust gas treating body.

However, if the length of the portion where the first mat and the second mat are connected is less than 5 mm or less than $1/20$ the length of the one-sheet mat in the longitudinal direction, the first mat and the second mat maybe separated by tearing during transportation carried out before folding the first mat and the second mat.

If the length of the portion where the first mat and the second mat are connected is more than 150 mm or more than $1/3$ the length of the one-sheet mat in the longitudinal direction, a strong repulsive force is caused when the first mat and the second mat are folded, which may deteriorate the productivity. Moreover, an elasticity is caused by the difference in periphery and the mat has creases when the holding sealing material is wound around an exhaust gas treating body, which may also deteriorate the productivity and the quality of a catalytic converter.

(8) In the holding sealing material of the present embodiment and the method for manufacturing the holding sealing material of the present embodiment, a slit formed on at least one of the front face and the back face of the one-sheet mat in the thickness direction of the one-sheet mat is formed in the portion where the first mat and the second mat are foldably connected. The depth of the slit is preferably 1/5 to 4/5 the thickness of the one-sheet mat.

Forming the slit enables easy folding of the portion where the first mat and the second mat are foldably connected. A slit being 1/5 to 4/5 the thickness of the one-sheet mat achieves particularly easy folding of the portion where the first mat and the second mat are connected, and prevents separation of the one-sheet mat by tearing.

In contrast, a slit having a depth of less than 1/5 of the thickness of the mat still causes a strong elasticity, which is not preferred.

A slit having a depth of more than 4/5 of the thickness of the mat may cause separation of the mat by tearing during transportation that is a prior stage before the folding the first mat and the second mat or during winding the mat around an exhaust gas treating body, which is not preferred either.

(9) In the method for manufacturing the holding sealing material of the present embodiment, forming a slit may be simultaneously carried out with punching out.

Thereby, a slit can be formed without increasing the number of the steps.

(10) In the method for manufacturing the holding sealing material of the present embodiment, forming a slit may be carried out after punching out.

Forming a slit after punching out enables fine adjustment of the depth and the location of the slit.

(11) In the holding sealing material of the present embodiment and the method for manufacturing the holding sealing material of the present embodiment, the first mat and the second mat each include a pair of fitting portions configured to fit to each other when the holding sealing material is wound around an exhaust gas treating body.

Forming a pair of fitting portions in each of the first mat and the second mat enables to stabilize the position of the holding sealing material by fitting both end portions of the first mat and the second mat when the holding sealing material is wound around an exhaust gas treating body.

(12) In the holding sealing material of the present embodiment, the one-sheet mat has a thickness of preferably 1.5 to 15 mm. A one-sheet mat having a thickness within the above range can prevent separation of the one-sheet mat by tearing when the portion where the first mat and the second mat are connected is folded.

(13) In the holding sealing material of the present embodiment, the one-sheet mat has a weight per unit area of preferably 400 to 2,000 $g/cm^2$.

A one-sheet having a weight per unit area within the above range can form a holding sealing material with high thermal insulation performance by layering the first mat and the second mat.

(14) In the holding sealing material of the present embodiment, the one-sheet mat is needle-punched.

Needle-punching the one-sheet mat can prevent separation of the one-sheet mat by tearing when the portion where the first mat and the second mat are connected is folded.

Needle-punching along the folding direction enables easy folding.

(15) In the holding sealing material of the present embodiment, the inorganic fibers have an average fiber length of preferably 4 to 120 mm.

Inorganic fibers with an average fiber length within the above range can prevent separation of the first mat and the second mat by tearing when the portion where the first mat and the second mat are connected is folded.

(16) In the holding sealing material of the present embodiment and the method for manufacturing the holding sealing material of the present embodiment, the one-sheet mat further includes identification information for identifying the folding direction on at least one surface of the one-sheet mat.

Forming identification information can prevent the portion where the first mat and the second mat are connected from being folded in a wrong direction.

(17) In the method for manufacturing the holding sealing material of the present embodiment, identification information is preferably formed before punching out.

Confirming the front face and the back face of the mat material and the direction of folding the portion where the first mat and the second mat are connected and then forming identification information before punching out can prevent the portion where the first mat and the second mat are connected from being folded in a wrong direction even after punching out among many mats, in which some of punched mats have the front faces facing up and others have the back faces facing up.

(18) In the holding sealing material of the present embodiment, the inorganic fibers are made of preferably low-crystalline alumina, and more preferably low-crystalline alumina having a mullite composition.

Inorganic fibers made of low-crystalline alumina are less likely to be broken when the portion where the first mat and the second mat are connected is folded. Inorganic fibers made of low-crystalline alumina having a mullite composition are much less likely to be broken when the portion where the first mat and the second mat are connected is folded.

(19) The exhaust gas purifying apparatus of the present embodiment includes an exhaust gas treating body, a casing accommodating the exhaust gas treating body, and a holding sealing material wound around the exhaust gas treating body and placed between the exhaust gas treating body and the casing. The holding sealing material includes a one-sheet mat that includes inorganic fibers. The one-sheet mat includes a first mat with a first side face and a second mat with a second side face. A part of the first side face and a part of the second side face are foldably and integrally connected. The holding sealing material is placed between the exhaust gas treating body and the casing in such a manner that a portion where the first mat and the second mat are connected is folded to layer the first mat and second mat.

This exhaust gas purifying apparatus includes a thick holding sealing material formed by layering the first mat and the second mat and thus achieves excellent thermal insulation performance of the exhaust gas treating body.

Additionally, since the exhaust gas purifying apparatus includes no organic components for fixing plural mats, such as machine sewing thread and an adhesive material, the amount of organic components in exhaust gases can be reduced.

(20) The method for manufacturing the exhaust gas purifying apparatus of the present embodiment includes: providing a holding sealing material, the holding sealing material including a one-sheet mat that includes inorganic fibers, the one-sheet mat including a first mat with a first side face and a second mat with a second side face, a part of the first side face and a part of the second side face being foldably and integrally connected, the holding sealing material being provided by folding a portion where the first mat and the second mat are connected to layer the first mat and the second mat; winding the holding sealing material around an exhaust gas treating body; and accommodating the exhaust gas treating body wound with the holding sealing material in a casing.

This method enables to manufacture a holding sealing material in which the first mat and the second mat are layered in fewer steps and to layer the mats without having a wrong combination.

As a result, an exhaust gas purifying apparatus having a holding sealing material with plural layers of mats can be manufactured in fewer steps at a good yield.

(Second Embodiment)

The following describes a second embodiment that includes an embodiment of the holding sealing material, the method for manufacturing the holding sealing material, the exhaust gas purifying apparatus, and the method for manufacturing the exhaust gas purifying apparatus.

In a holding sealing material according to the second embodiment of the present invention, the arrangement of the recessed portion and projected portion of the pair of fitting portions of the first mat is different from the arrangement of the recessed portion and projected portion of the pair of fitting portions of the second mat. All other configurations are the same as those of the holding sealing material according to the first embodiment of the present invention.

Figure 6:
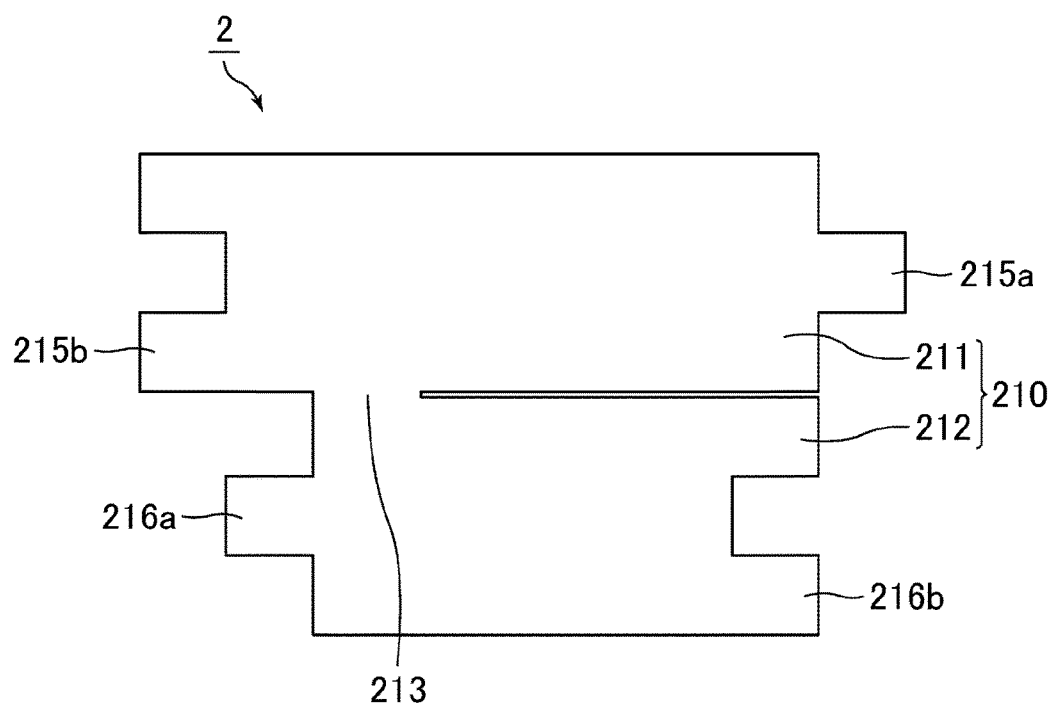
FIG. 6 illustrates a schematic plan view of an example of the holding sealing material according to the second embodiment of the present invention.

FIG. 6 illustrates a schematic plan view of an example of the holding sealing material according to the second embodiment of the present invention.

A holding sealing material 2 of the present embodiment illustrated in FIG. 6 is formed of a one-sheet mat 210 including inorganic fibers.

The one-sheet mat 210 includes a first mat 211 and a second mat 212, and the first mat 211 and the second mat 212 are foldably and integrally connected at a connected portion 213.

In the holding sealing material 2 of the present embodiment, the arrangement of the recessed portion and projected portion of the pair of fitting portions of the first mat 211 is different from the arrangement of the recessed portion and projected portion of the pair of fitting portions of the second mat 212. In other words, a projected portion 215a of the pair of fitting portions of the first mat 211 is located on the same side as a recessed portion 216b of the pair of fitting portions of the second mat 212. Also, a recessed portion 215b of the pair of fitting portions of the first mat 211 is located on the same side as a projected portion 216a of the pair of fitting portions of the second mat 212.

The functions of the holding sealing material 2 of the present embodiment is the same as those of the holding sealing material of the first embodiment of the present invention. Meanwhile, the present embodiment has a different aspect from the first embodiment in punching out a one-sheet mat from a mat material for manufacturing a holding sealing material. Thus, the aspect will be described in the following.

Figure 7:
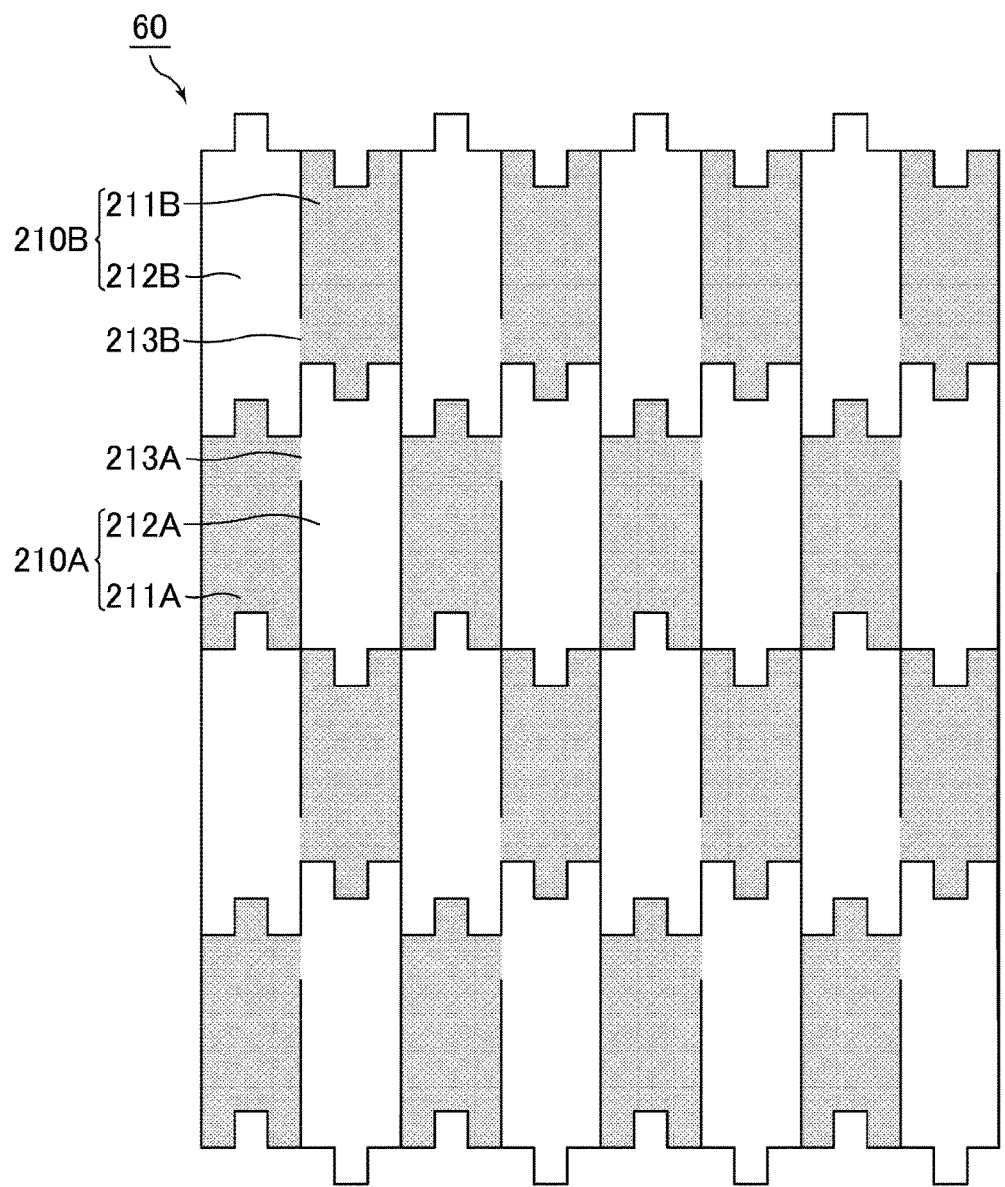
FIG. 7 illustrates a schematic plan view of a pattern for punching out the mats of the second embodiment of the present invention from a mat material.

FIG. 7 illustrates a schematic plan view of a pattern for punching out the mats of the second embodiment of the present invention from a mat material.

A mat material 60 illustrated in FIG. 7 has a sufficient area for punching out plural one-sheet mats 210 according to the present embodiment, like the mat material 50 illustrated in FIG. 2.

Here, a one-sheet mat 210A and a one-sheet mat 210B neighboring to the one-sheet mat 210A are focused among the one-sheet mats punched from the mat material 60.

The one-sheet mat 210A includes a first mat 211A and a second mat 212A, and the first mat 211A and the second mat 212A are foldably and integrally connected at a connected portion 213A.

The one-sheet mat 210B includes a first mat 211B and a second mat 212B, and the first mat 211B and the second mat 212B are foldably and integrally connected at a connected portion 213B.

Comparing the one-sheet mat 210A with the one-sheet mat 210B, both of which are punched out from the mat material 60, indicates that these two mats are identical to each other.

In FIG. 7, the first mat 211A of the one-sheet mat 210A and the first mat 211B of the one-sheet mat 210B are up-down (left-right) symmetric, whereby these two mats seem to have different arrangements. However, when the one-sheet mat 210B is turned 180°, it is clear that the one-sheet mat 210A and the one-sheet mat 210B have the same arrangement. Thus, the one-sheet mat 210A and the one-sheet mat 210B are identical to each other.

On the other hand, in the pattern for punching out the mats of the first embodiment as illustrated in FIG. 2, even when one of the punched out one-sheet mats is turned 180°, the one-sheet mat does not have the same arrangement as a neighboring one-sheet mat. In this case, the one-sheet mat needs to be turned over to have the same arrangement as the neighboring one-sheet mat. If the front face and the back face of the mat material are the same, the one-sheet mat has an identical arrangement to the neighboring one-sheet mat. However, if the front face and the back face of the mat material are different, the one-sheet mat has a different arrangement from the neighboring one-sheet mat.

Thus, the present embodiment enables to punch out holding sealing materials to manufacture holding sealing materials with identical arrangements regardless of which face of the mat is the front face of the mat.

The holding sealing material, the method for manufacturing the holding sealing material, the exhaust gas purifying apparatus, and the method for manufacturing the exhaust gas purifying apparatus of the second embodiment are the same as those of the first embodiment of the present invention, excepting the above description. Thus, the detailed explanation thereof will be omitted.

The second embodiment of the present invention can achieve the following effects in addition to the effects (1) to (20) described for the first embodiment of the present invention.

(21) In the holding sealing material of the present embodiment and the method for manufacturing the holding sealing material of the present embodiment, the arrangement of the recessed portion and projected portion of the pair of fitting portions of the first mat is different from the arrangement of the recessed portion and projected portion of the pair of fitting portions of the second mat.

In the case where the front face and the back face of the mat are different, if the arrangement of the recessed portion and projected portion of the pair of fitting portions of the first mat is different from the arrangement of the recessed portion and projected portion of the pair of fitting portions of the second mat, the positional relationship among the portion where the first mat and the second mat are connected, the recessed portion, and the projected portion is always the same whichever face is facing up. Thus, holding sealing materials with identical arrangements can be manufactured from one mat material regardless of which face of the mat is the front face of the mat.

(Third Embodiment)

The following describes a third embodiment that includes an embodiment of the holding sealing material, the method for manufacturing the holding sealing material, the exhaust gas purifying apparatus, and the method for manufacturing the exhaust gas purifying apparatus.

In a holding sealing material according to the third embodiment of the present invention, an end portion of the first mat in the longitudinal direction is located in line with an end portion of the second mat in the longitudinal direction. All the other configurations are the same as those of the holding sealing material according to the first embodiment or the second embodiment of the present invention.

Figure 8:
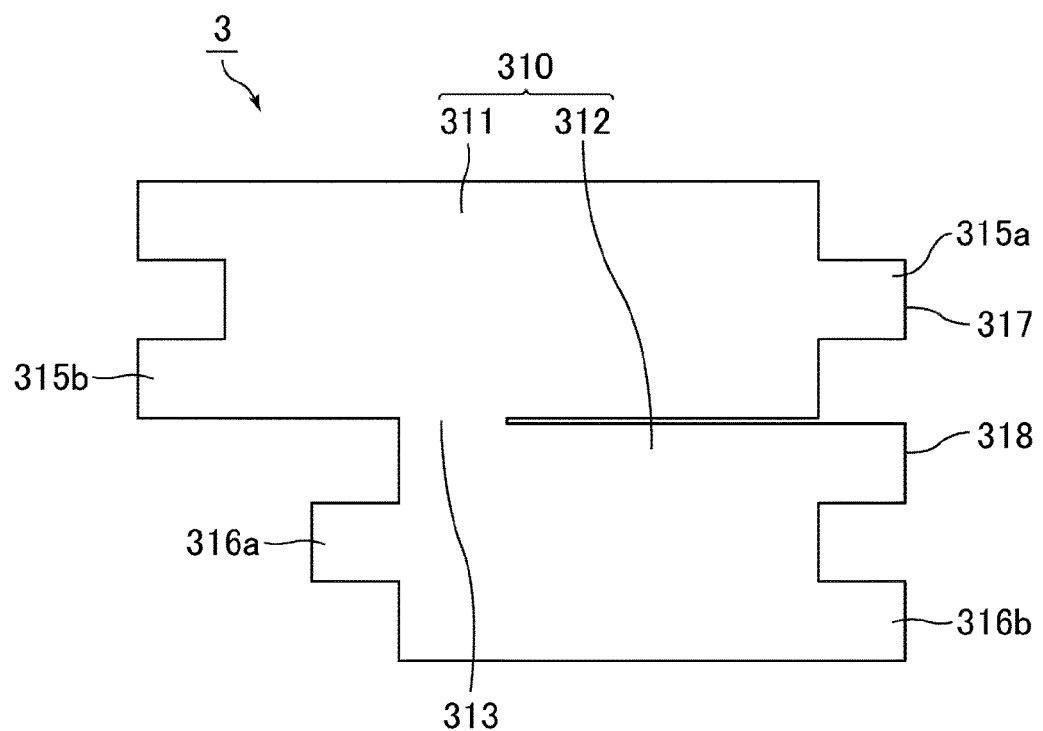
FIG. 8 illustrates a schematic plan view of an example of the holding sealing material according to the third embodiment of the present invention.

FIG. 8 illustrates a schematic plan view of an example of the holding sealing material according to the third embodiment of the present invention.

A holding sealing material 3 of the present embodiment illustrated in FIG. 8 is formed of a one-sheet mat 310 including inorganic fibers.

The one-sheet mat 310 includes a first mat 311 and a second mat 312, and the first mat 311 and the second mat 312 are foldably and integrally connected at a connected portion 313.

In the holding sealing material 3 of the present embodiment, an end portion 317 (a tip end of a projected portion 315a) of the first mat 311 in the longitudinal direction is located in line with an end portion 318 (the ends of the protruded portions of a recessed portion 316b) of the second mat 312 in the longitudinal direction.

The term "an end portion in the longitudinal direction" refers to a farthest edge in the longitudinal direction in the first mat or the second mat. If the mat has a pair of fitting portions, it refers to a tip end of a projected portion or the ends of the protruded portions of a recessed portion.

The phrase "an end portion in the longitudinal direction is located in line" means that one of the end portions of one mat in the longitudinal direction is located in line with one of the end portions of the other mat in the longitudinal direction. In the holding sealing material 3 of the present embodiment illustrated in FIG. 8, the right end portion of the first mat 311 in the longitudinal direction and the right end portion of the second mat 312 in the longitudinal direction are lined, but the left end portion of the first mat and the left end portion of the second mat (the ends of the protruded portions of the recessed portion 315b and the tip end portion of the projected portion 316a) are not lined.

In the holding sealing material 3 illustrated in FIG. 8, the arrangement of the recessed portion and projected portion of the pair of fitting portions (315a, 315b) of the first mat are different from the arrangement of the recessed portion and projected portion of the pair of fitting portions (316a, 316b) of the second mat, as described in the holding sealing material of the second embodiment of the present invention.

However, the holding sealing material of the present embodiment only requires that an end portion of the first mat is located in line with an end portion of the second mat in the longitudinal direction. In other words, the arrangement of the recessed portion and projected portion of the pair of fitting portions of the first mat may be the same as the arrangement of the recessed portion and projected portion of the pair of fitting portions of the second mat, like the holding sealing material of the first embodiment of the present invention.

The functions of the holding sealing material 3 of the present embodiment are the same as those of the first embodiment of the present invention and the second embodiment of the present invention, excepting the aspect of punching out one-sheet mats from a mat material in manufacturing the holding sealing material. The aspect will be described below.

Figure 9:
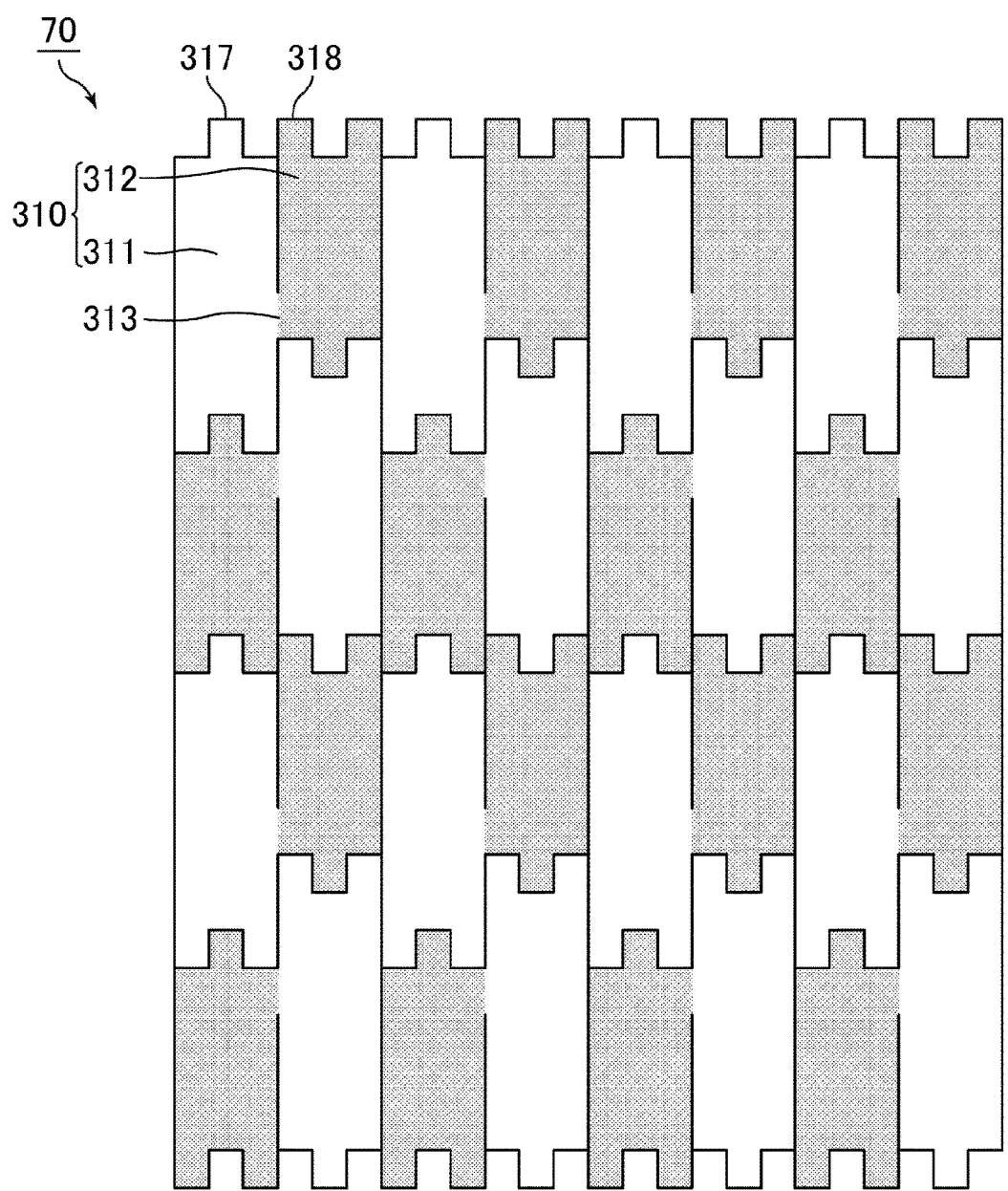
FIG. 9 illustrates a schematic plan view of a pattern for punching out the mats of the third embodiment of the present invention from a mat material.

FIG. 9 illustrates a schematic plan view of a pattern for punching out the mats of the third embodiment of the present invention from a mat material.

A mat material 70 illustrated in FIG. 9 has a sufficient area for punching plural one-sheet mats 310 according to the present embodiment, like the mat material 60 illustrated in FIG. 7. In FIG. 9, the dimensions of the first mat and the second mat, and the number of the one-sheet mats to be punched out are the same as those in FIG. 7.

In the method for manufacturing the holding sealing material of the present embodiment, the mat material is punched out in such a manner that an end portion of the first mat in the longitudinal direction is located in line with an end portion of the second mat in the longitudinal direction. In this method, an end portion 317 of the first mat in the longitudinal direction is located in line with an end portion 318 of the second mat in the longitudinal direction, and thus both ends of the mat material in the longitudinal direction have no protruding projected portions or protruding recessed portions. Thereby, the same number of one-sheet mats having the same dimensions of the first mat and the second mat can be punched out from a mat material with a smaller area, compared to the aspect shown in FIG. 7. As a result, the mat material can produce less waste.

The holding sealing material, the method for manufacturing the holding sealing material, the exhaust gas purifying apparatus, and the method for manufacturing the exhaust gas purifying apparatus of the third embodiment are the same as those of the first embodiment of the present invention, excepting the above description. Thus, the detailed explanation thereof will be omitted.

The third embodiment of the present invention can achieve the following effect in addition to the effects (1) to (21) described in the first embodiment of the present invention and the second embodiment of the present invention.

(22) In the method for manufacturing the holding sealing material of the present embodiment, the mat material is punched out in such a manner that an end portion of the first mat in the longitudinal direction is located in line with an end portion of the second mat in the longitudinal direction.

This method achieves less waste of the mat material and enhance the yield of the material.

(Fourth Embodiment)

The following describes a fourth embodiment that includes an embodiment of the holding sealing material, the method for manufacturing the holding sealing material, the exhaust gas purifying apparatus, and the method for manufacturing the exhaust gas purifying apparatus.

In a holding sealing material according to the fourth embodiment of the present invention, two or more of the portions where the first mat and the second mat are foldably connected are formed.

All other configurations are the same as those of the holding sealing material of the first embodiment of the present invention.

Figure 10A:
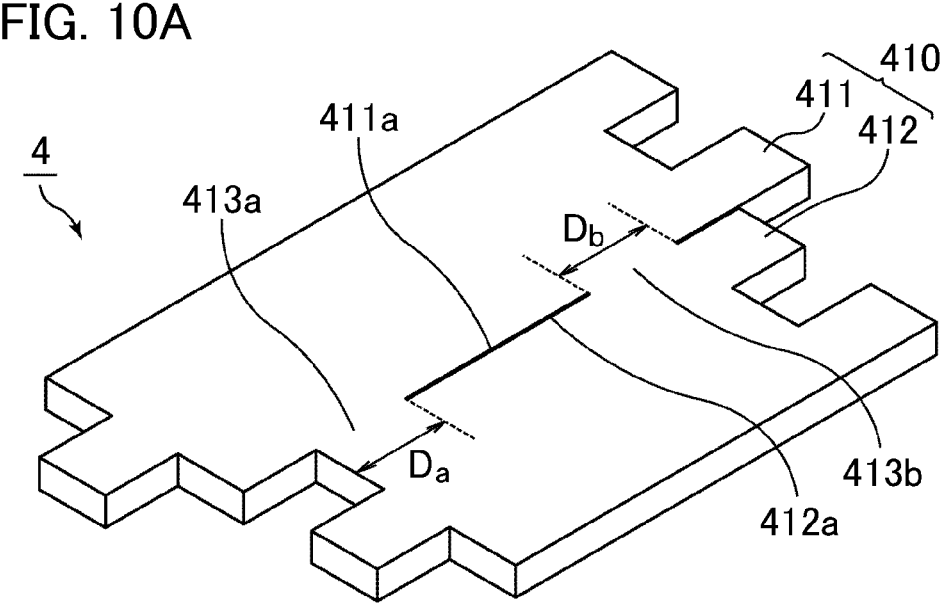
FIG. 10A illustrates a schematic perspective view of an example of the holding sealing material according to the fourth embodiment of the present invention.

FIG. 10A illustrates a schematic perspective view of an example of the holding sealing material according to the fourth embodiment of the present invention.

Figure 10B:
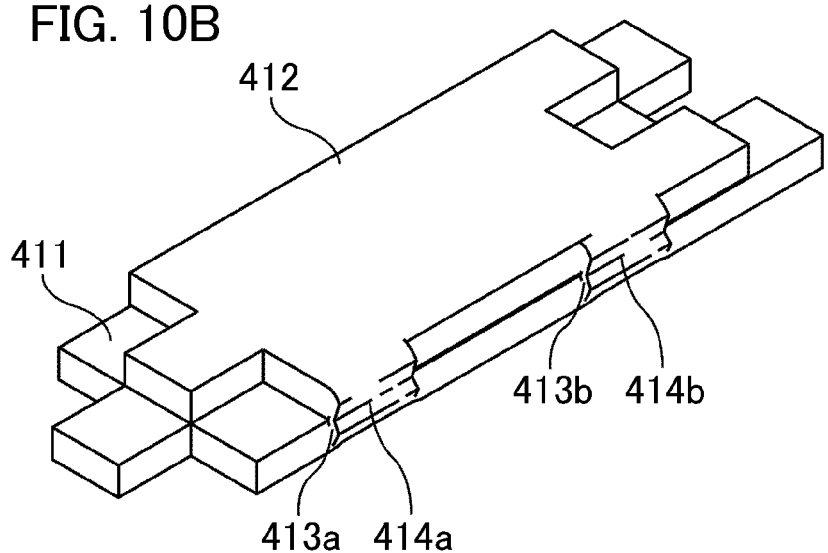
FIG. 10B illustrates a schematic perspective view of the holding sealing material illustrated in FIG. 10($a$), in which the portion where the first mat and the second mat are connected is folded to layer the first mat and the second mat.

FIG. 10B illustrates a schematic perspective view of the holding sealing material illustrated in FIG. 10A, in which the portion where the first mat and the second mat are connected is folded to layer the first mat and the second mat.

A holding sealing material 4 of the present embodiment illustrated in FIG. 10A is formed of a one-sheet mat 410 including inorganic fibers.

The one-sheet mat 410 includes a first mat 411 and a second mat 412.

The first mat 411 and the second mat 412 are foldably and integrally connected at two connected portions 413a and 413b.

The connected portions 413a and 413b each are part of a first side face 411a of the first mat 411 and part of a second side face 412a of the second mat 412.

If two or more connected portions are formed, the length of the portion where the first mat 411 and the second mat 412 are foldably connected is defined as the total length of the connected portion 413a indicated by Da and the connected portion 413b indicated by Db in FIG. 10A.

The connected portions may have equal lengths to each other, or one connected portion may have a shorter length than the other connected portion.

Forming connected portions having different lengths enables one connected portion with a shorter length to serve as a scissile connected portion.

The connected portions 413a and 413b each may have a slit like the connected portion of the holding sealing material according to the first embodiment of the present invention.

The slits may have equal depths to each other, or the slit of one connected portion may have a larger depth than the slit of the other connected portion.

Forming slits having different depths enables one connected portion with the deeper slit to serve as a scissile connected portion.

FIG. 10B illustrates a schematic perspective view of the holding sealing material illustrated in FIG. 10(a), in which the portion where the first mat and the second mat are connected is folded to layer the first mat and the second mat.

As illustrated in FIG. 10B, the connected portions 413a and 413b are folded to layer the second mat 412 on the first mat 411, thereby forming a layered mat.

The FIG. 10B illustrates a state where the connected portions 413a and 413b are folded in the direction such that the slits 414a and 414b spread out.

Examples of the method for manufacturing the holding sealing material 4 of the present embodiment include a method of changing the pattern of the Thomson blade used for punching out in the method for manufacturing the holding sealing material according to the first embodiment of the present invention. Specifically, the Thomson blade is configured to have two portions where the blade does not penetrate the mat material. If the slits are required to have different depths, the Thomson blade is configured to have different blade depths at the portions where the blade does not penetrate the mat material.

The holding sealing material, the method for manufacturing the holding sealing material, the exhaust gas purifying apparatus, and the method for manufacturing the exhaust gas purifying apparatus of the fourth embodiment are the same as those of the first embodiment of the present invention, excepting the above description. Thus, the detailed explanation thereof will be omitted.

The fourth embodiment of the present invention can achieve the following effects in addition to the effects (1) to (22) described in the first to third embodiments of the present invention.

(23) In the holding sealing material of the present embodiment and the method for manufacturing the holding sealing material of the present embodiment, two or more of the portions where the first mat and the second mat are foldably connected are formed.

Forming two or more portions where the first mat and the second mat are connected prevents the first mat and the second mat from having angle misalignment when the portions where the first mat and the second mat are foldably connected are folded. Thus, the first mat and the second mat can be layered keeping the first side face of the first mat and the second side face of the second mat located in parallel to each other.

(24) In the holding sealing material of the present embodiment and the method for manufacturing the holding sealing material of the present embodiment, one portion where the first mat and the second mat are foldably connected is shorter and more scissile than the other connected portion.

This holding sealing material prevents the first mat and the second mat from having angle misalignment when the portions where the first mat and the second mat are connected are folded. In addition, the shorter and more scissile connected portion where the first mat and the second mat are foldably connected can be cut in the winding. Thus, an elasticity caused by the difference in periphery when the holding sealing material is wound can be reduced, thereby achieving easy winding of the holding sealing material around the exhaust gas treating body.

(Fifth Embodiment)

The following describes a fifth embodiment that includes an embodiment of the holding sealing material, the method for manufacturing the holding sealing material, the exhaust gas purifying apparatus, and the method for manufacturing the exhaust gas purifying apparatus.

In a holding sealing material according to the fifth embodiment of the present invention, the length of the first mat in the width direction perpendicular to the longitudinal direction is different from the length of the second mat in the width direction perpendicular to the longitudinal direction.

All other configurations are the same as those of the holding sealing material according to the first embodiment of the present invention.

Figure 11A:
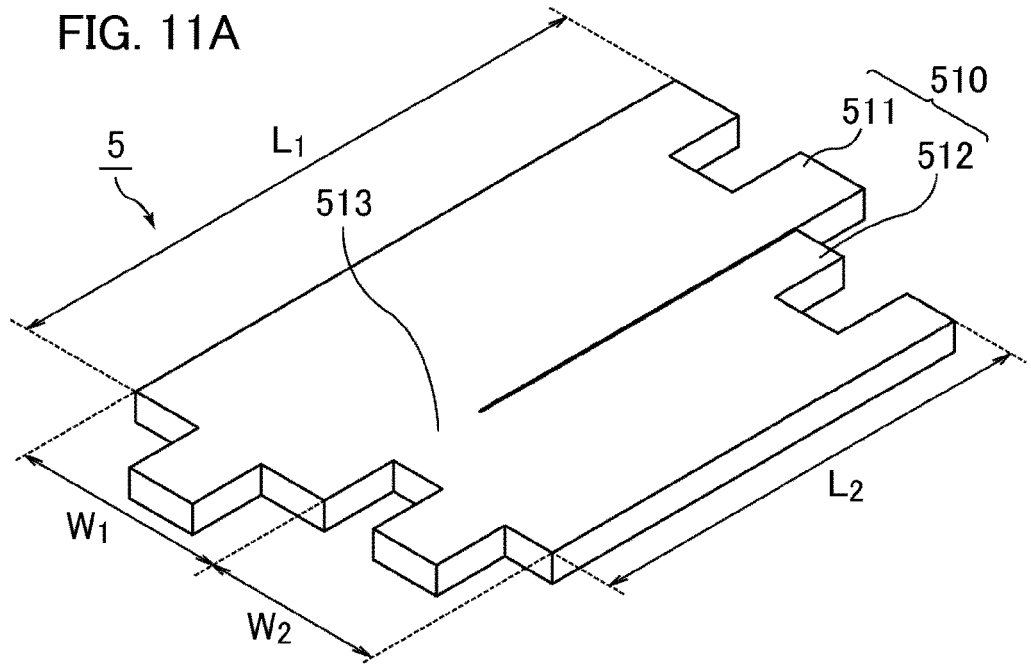
FIG. 11A illustrates a schematic perspective view of an example of the holding sealing material according to the fifth embodiment of the present invention.

FIG. 11A illustrates a schematic perspective view of an example of the holding sealing material according to the fifth embodiment of the present invention.

Figure 11B:
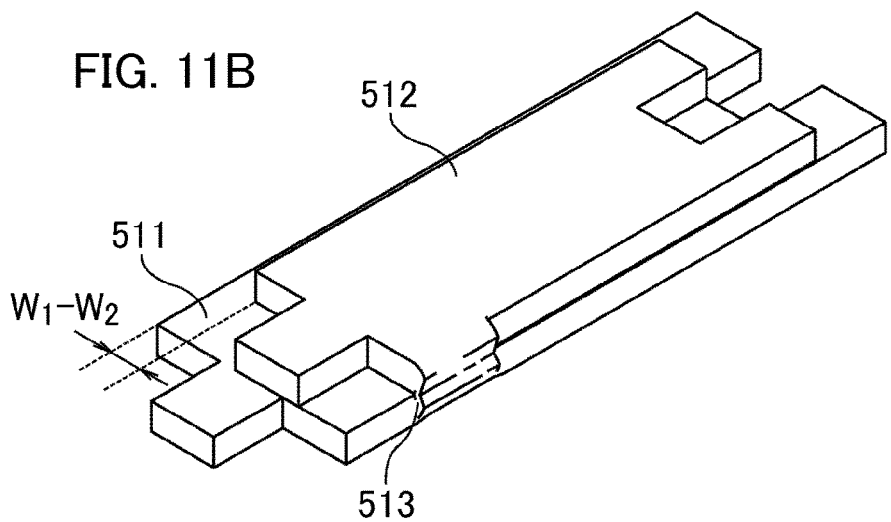
FIG. 11B illustrates a schematic perspective view of the holding sealing material illustrated in FIG. 11A, in which the portion where the first mat and the second mat are connected is folded to layer the first mat and the second mat.

FIG. 11B illustrates a schematic perspective view of the holding sealing material illustrated in FIG. 11A, in which the portion where the first mat and the second mat are connected is folded to layer the first mat and the second mat.

A holding sealing material 5 of the present embodiment illustrated in FIG. 11A is formed of a one-sheet mat 510 including inorganic fibers.

The one-sheet mat 510 includes a first mat 511 and a second mat 512.

The first mat 511 and the second mat 512 are foldably and integrally connected at a connected portion 513.

The length $L_1$ of the first mat 511 in the longitudinal direction is longer than the length $L_2$ of the second mat 512 in the longitudinal direction, and the width $W_1$ of the first mat 511 is longer than the width $W_2$ of the second mat 512.

As illustrated in FIG. 11B, when the portion 513 where the first mat 511 and the second mat 512 are connected is folded to layer the first mat 511 and the second mat 512, the first mat 511 has a portion where the second mat 512 is not layered. The width of the portion corresponds to the difference ($W_1 - W_2$) between the width $W_1$ of the first mat 511 and the width $W_2$ of the second mat 512.

The holding sealing material 5 layered in this manner is wound around an exhaust gas treating body with the second mat 512 facing the exhaust gas treating body. The effects resulting therefrom will be described later.

Figure 12A:
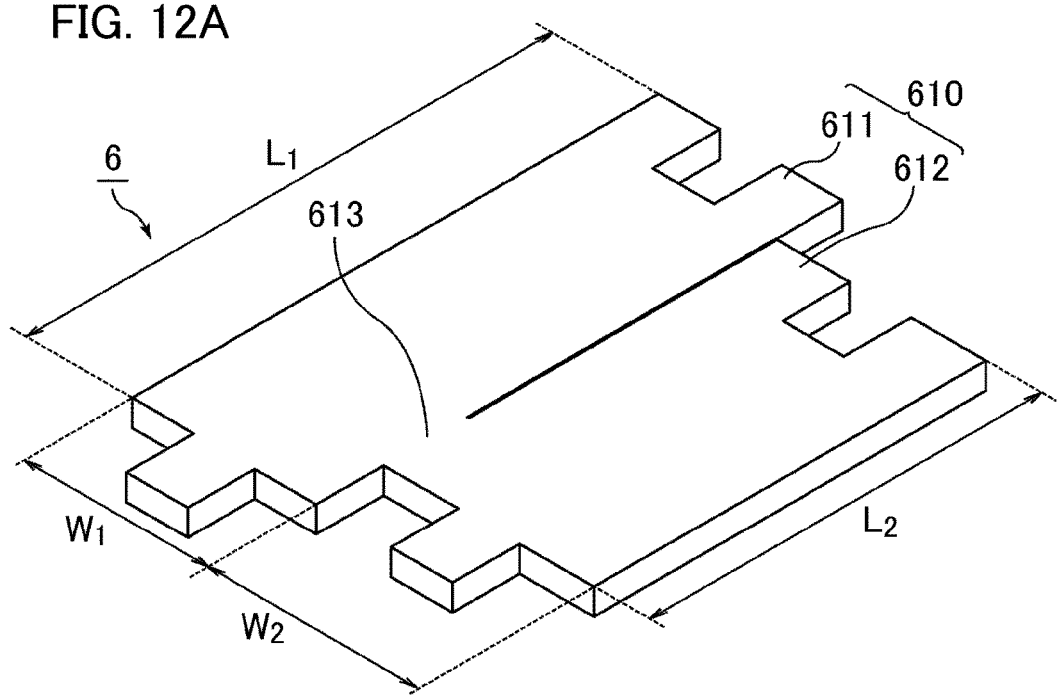
FIG. 12A illustrates a schematic perspective view of another example of the holding sealing material according to the fifth embodiment of the present invention.

FIG. 12A illustrates a schematic perspective view of another example of the holding sealing material according to the fifth embodiment of the present invention.

Figure 12B:
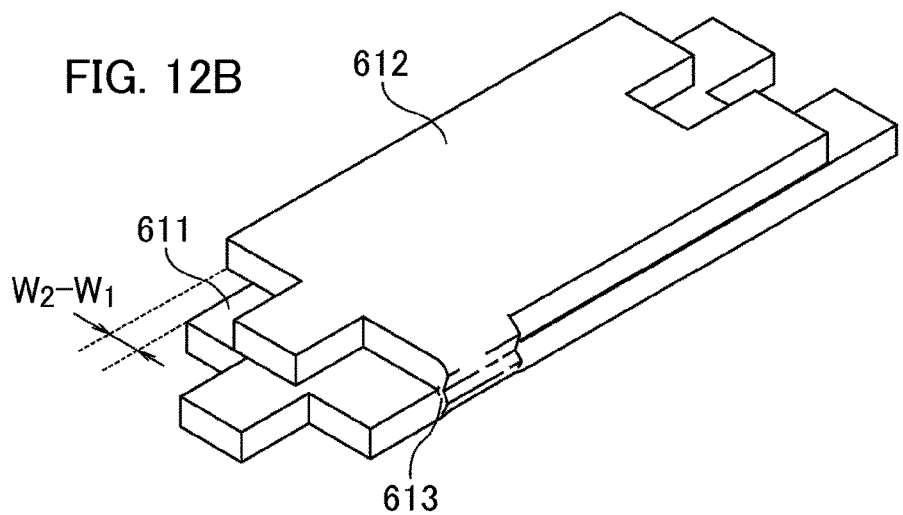
FIG. 12B illustrates a schematic perspective view of the holding sealing material illustrated in FIG. 12A, in which the portion where the first mat and the second mat are connected is folded to layer the first mat and the second mat.

FIG. 12B illustrates a schematic perspective view of the holding sealing material illustrated in FIG. 12A, in which the portion where the first mat and the second mat are connected is folded to layer the first mat and the second mat.

A holding sealing material 6 of the present embodiment illustrated in FIG. 12A is formed of a one-sheet mat 610 including inorganic fibers.

The one-sheet mat 610 includes a first mat 611 and a second mat 612.

The first mat 611 and the second mat 612 are foldably and integrally connected at a connected portion 613.

The length $L_1$ of the first mat 611 in the longitudinal direction is longer than the length $L_2$ of the second mat 612 in the longitudinal direction, and the width $W_1$ of the first mat 611 is shorter than the width $W_2$ of the second mat 612.

As illustrated in FIG. 12B, when the portion 613 where the first mat 611 and the second mat 612 are connected is folded to layer the first mat 611 and the second mat 612, the second mat 612 has a protruded portion over the first mat 611. The width of the protruded portion corresponds to the difference ($W_2-W_1$) between the width $W_1$ of the first mat 611 and the width $W_2$ of the second mat 612.

The holding sealing material 6 layered in this manner is wound around an exhaust gas treating body with the second mat 612 facing the exhaust gas treating body. The effects resulting therefrom will be described later.

In the holding sealing material of the present embodiment, the difference between the length in the width direction of the first mat and the length in the width direction of the second mat is preferably 10 mm or less.

Figure 13:
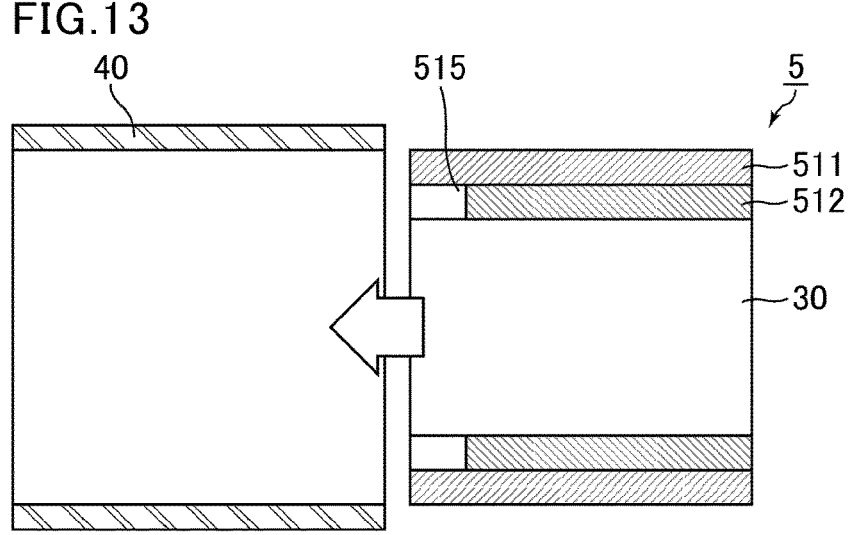
FIG. 13 illustrates a schematic cross-sectional view showing how an exhaust gas treating body wound with the holding sealing material according to the fifth embodiment of the present invention illustrated in FIG. 11B is stuffed into a casing.

FIG. 13 illustrates a schematic cross-sectional view showing that an exhaust gas treating body wound with the holding sealing material according to the fifth embodiment of the present invention illustrated in FIG. 11B is to be stuffed into a casing.

The direction of stuffing is indicated by an arrow in FIG. 13.

When the holding sealing material 5 in which the first mat 511 and the second mat 512 are layered as illustrated in FIG. 11B is wound around the exhaust gas treating body 30, the second mat 512 having the shorter length in the longitudinal direction is faced to the exhaust gas treating body 30.

The holding sealing material 5 has a portion where the first mat 511 and the second mat 512 are not layered. The width of the portion corresponds to the difference ($W_1-W_2$) between the width $W_1$ of the first mat 511 and the width $W_2$ of the second mat 512.

Thus, the holding sealing material has a level difference 515 at an end portion (left end portion in FIG. 13).

The level difference 515 provides a gap between the first mat 511 and the exhaust gas treating body 30. Thus, when the exhaust gas treating body is stuffed into a casing 40 from the end having the level difference 515, the first mat 511 bends inward (toward the exhaust gas treating body) at the beginning of the stuffing. Thereby, the stuffing becomes easy.

Figure 14A:
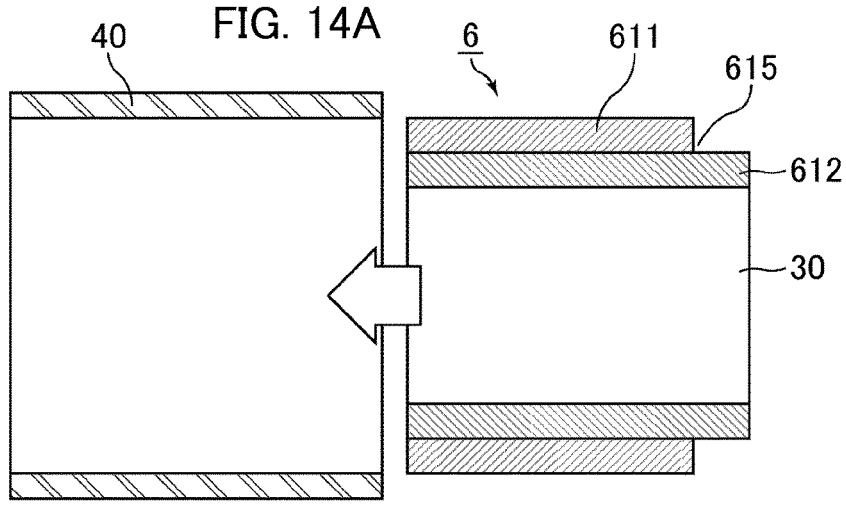
FIG. 14A illustrates a schematic cross-sectional view showing how an exhaust gas treating body wound with the holding sealing material according to the fifth embodiment of the present invention illustrated in FIG. 12B is stuffed into a casing.
Figure 14B:
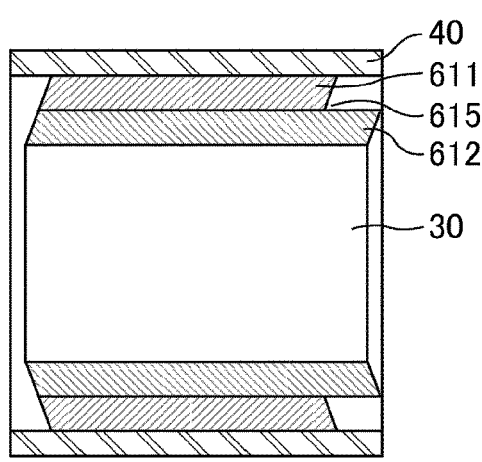
FIG. 14B illustrates a schematic cross-sectional view showing how an exhaust gas treating body wound with the holding sealing material according to the fifth embodiment of the present invention illustrated in FIG. 12B is stuffed into a casing.

FIG. 14A illustrates a schematic cross-sectional view showing that an exhaust gas treating body wound with the holding sealing material according to the fifth embodiment of the present invention illustrated in FIG. 12B is to be stuffed into a casing. FIG. 14B illustrates a schematic cross-sectional view showing that an exhaust gas treating body wound with the holding sealing material according to the fifth embodiment of the present invention illustrated in FIG. 12B has been stuffed into a casing.

The direction of the stuffing is indicated by an arrow in FIG. 14A.

When the holding sealing material 6 in which the first mat 611 and the second mat 612 are layered as illustrated in FIG. 12B is wound around the exhaust gas treating body 30, the second mat 612 having the shorter length in the longitudinal direction is faced to the exhaust gas treating body 30.

The holding sealing material 6 has a portion where the first mat 611 and the second mat 612 are not layered. The width of the portion corresponds to the difference ($W_2-W_1$) between the width $W_1$ of the first mat 611 and the width $W_2$ of the second mat 612.

Thus, the holding sealing material has a level difference 615 at an end portion (right end portion in FIG. 14A).

FIG. 14B illustrates a schematic view of the exhaust gas purifying apparatus, in which the holding sealing material has been stuffed into a casing from the end portion (left end portion in FIG. 14A) not having a level difference.

When the exhaust gas treating body wound with the holding sealing material is stuffed into the casing, a cross section of the holding sealing material declines to an end of the exhaust gas treating body by a friction between the casing and the holding sealing material.

In FIG. 14B, the upper cross section of the exhaust gas treating body declines from the upper right to the lower left. In the following, the upper cross section of the exhaust gas treating body is focused.

In the focused part, the first mat and the second mat forming the holding sealing material also decline from upper right to lower left. As a result, the right end of the second mat 612, which has a width of substantially the same length as the length in the longitudinal direction of the exhaust gas treating body 30, protrudes from the right end of the exhaust gas treating body 30 to the right.

If the first mat 611 has a width of substantially the same length as the length in the longitudinal direction of the exhaust gas treating body 30, the right end of the first mat 611 will protrude from the right end of the exhaust gas treating body 30 more than the second mat 612 does. The right end of the first mat 611 may problematically protrude from the right end of the casing 40 depending on cases.

As shown in the holding sealing material 6 of the present embodiment illustrated in FIG. 12B, if a level difference 615 is formed at an end portion of the holding sealing material, the first mat 611 can be prevented from protruding over the right end of the casing 40 even if the first mat 611 declines from upper right to lower left by stuffing.

The holding sealing material, the method for manufacturing the holding sealing material, the exhaust gas purifying apparatus, and the method for manufacturing the exhaust gas purifying apparatus of the fifth embodiment are the same as those of the first embodiment of the present invention, excepting the above description. Thus, the detailed explanation thereof will be omitted.

The fifth embodiment of the present invention can achieve the following effect in addition to the effects (1) to (24) described in the first to fourth embodiments of the present invention.

(25) In the holding sealing material of the present embodiment, the length of the first mat in the width direction perpendicular to the longitudinal direction is different from the length of the second mat in the width direction perpendicular to the longitudinal direction. The length difference between the first mat in the width direction and the second mat in the width direction is preferably 10 mm or less.

If the length of the first mat in the width direction is different from the length of the second mat in the width direction, the holding sealing material has a level difference at an end portion when wound around an exhaust gas treating body. Stuffing the exhaust gas treating body into the casing from the end portion having the level difference enables easy stuffing. Stuffing the exhaust gas treating body into the casing from the end portion not having the level difference can prevent the holding sealing material from protruding over an end portion of the casing after stuffing.

The difference between the lengths in the width direction is preferably 10 mm or less for appropriately achieving the above effects.

(Sixth Embodiment)

The following describes a sixth embodiment that includes an embodiment of the holding sealing material, the method for manufacturing the holding sealing material, the exhaust gas purifying apparatus, and the method for manufacturing the exhaust gas purifying apparatus.

In a holding sealing material according to the sixth embodiment of the present invention, when the holding sealing material is wound around a round pillar-shaped exhaust gas treating body, the pair of fitting portions of the first mat and the pair of fitting portions of the second mat satisfy the following formula (1) or (2), and the pair of fitting portions of the first mat and the pair of fitting portions of the second mat are located at different sites on the outer peripheral surface of the exhaust gas treating body.

When $a \geq b \times L_1/L_2$, $$(b+c) \times L_1/L_2 \leq a \leq (b-c+L_2) \times L_1/L_2 \quad (1).$$

Figure 15:
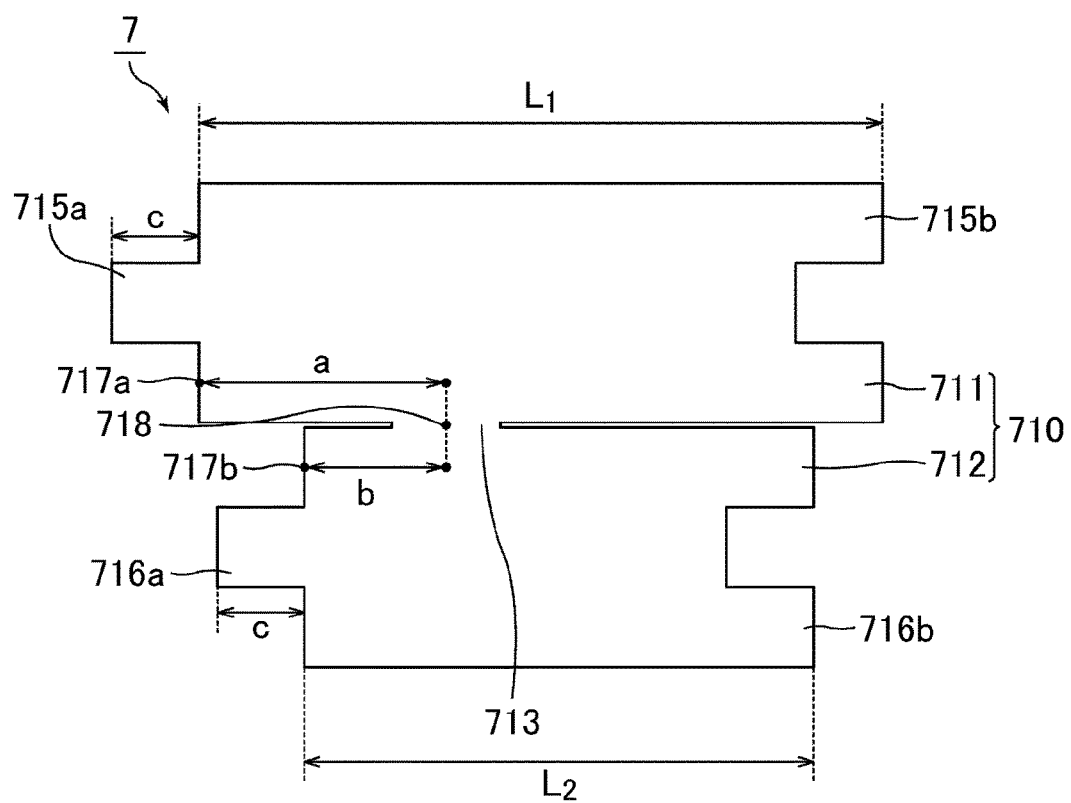
FIG. 15 illustrates a schematic plan view of an example of the holding sealing material according to the sixth embodiment of the present invention.

When $a < b \times L_1/L_2$, $$(b+c-L_2) \times L_1/L_2 \leq a \leq (b-c) \times L_1/L_2 \quad (2).$$

a: distance from a "starting position of the projected portion" to a "center of a connected portion" of the first mat b: distance from a "starting position of the projected portion" to a " center of the connected portion" of the second mat c: length of the projected portion of each fitting portion $L_1$: length of the first mat in a longitudinal direction $L_2$: length of the second mat in a longitudinal direction FIG. 15 illustrates a schematic plan view of an example of the holding sealing material according to the sixth embodiment of the present invention.

Figure 16A:
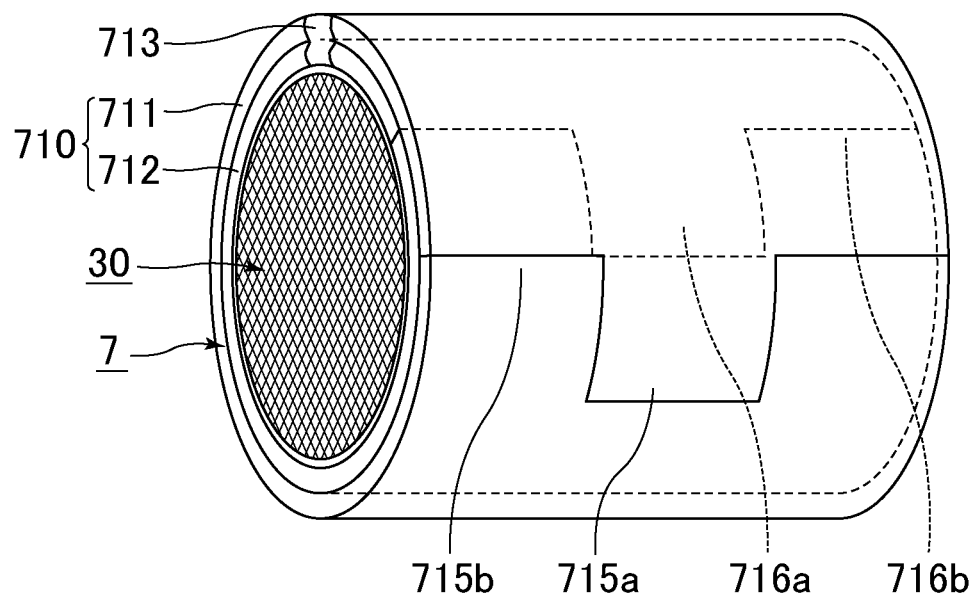
FIG. 16A illustrates a schematic perspective view of an example of the holding sealing material illustrated in FIG. 15 when the holding sealing material is wound around a round pillar-shaped exhaust gas treating body.
Figure 16B:
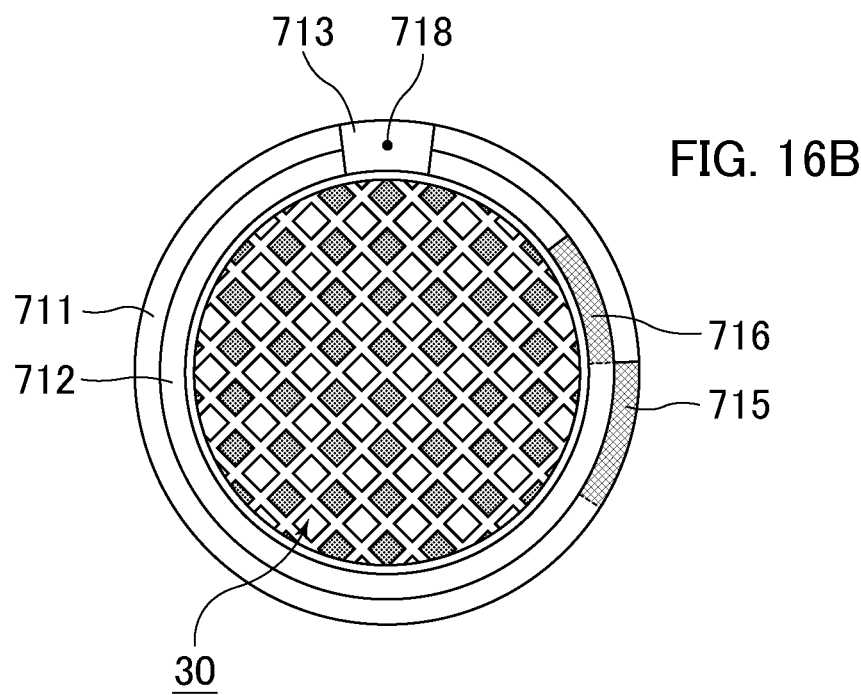
FIG. 16B illustrates a side view of FIG. 16A.

FIG. 16A illustrates a schematic perspective view of an example of the holding sealing material illustrated in FIG. 15 when the holding sealing material is wound around a round pillar-shaped exhaust gas treating body. FIG. 16B illustrates a side view of FIG. 16A.

A holding sealing material 7 of the present embodiment illustrated in FIG. 15 is formed of a one-sheet mat 710 including inorganic fibers.

The one-sheet mat 710 includes a first mat 711 and a second mat 712.

The first mat 711 and the second mat 712 are foldably connected at a connected portion 713.

FIG. 15 indicates lengths used in the formulas (1) and (2).

The length $L_1$ of the first mat 711 in the longitudinal direction is longer than the length $L_2$ of the second mat 712 in the longitudinal direction.

Usually, when a holding sealing material is wound around an exhaust gas treating body, a second mat having a shorter length in the longitudinal direction is placed nearer to the exhaust gas treating body, and a first mat having a longer length in the longitudinal direction is placed further from the exhaust gas treating body.

In order to wind both the first mat and the second mat without gaps, the length of the first mat in the longitudinal direction to be located outside needs to be longer than the length of the second mat in the longitudinal direction to be located inside. The length indicated by $(L_1-L_2)$ corresponds to the length needed for winding both the first mat and the second mat without gaps. This length is also referred to as a "difference in periphery".

The "starting position of the projected portion" of each of the first mat 711 and the second mat 712 is indicated by 717a and 717b in the figure, respectively, and these positions each are a starting position where the projected portion of the mat protrudes.

The distances from the starting positions to the center 718 of the connected portion 713 are indicated by "a" on the first mat 711 and "b" on the second mat 712, respectively. These distances are shown by lines in parallel to the longitudinal directions.

The length of the projected portion 715a of the pair of fitting portions of the first mat 711 and the length of the projected portion 716a of the pair of fitting portions of the second mat 712 are each indicated by "c".

FIG. 16A and FIG. 16B schematically illustrate the situation in which "when the holding sealing material is wound around an exhaust gas treating body, the pair of fitting portions of the first mat and the pair of fitting portions of the second mat are located at different sites on the outer peripheral surface of the exhaust gas treating body".

FIG. 16A illustrates that the pair of fitting portions (projected portion: 715a, recessed portion: 715b) of the first mat 711 and the pair of fitting portions (projected portion: 716a, recessed portion: 716b) of the second mat 712 are not overlapped.

In FIG. 16B, the position of the pair of fitting portions 715 of the first mat 711 and the position of the pair of fitting portions 716 of the second mat 712 are individually illustrated by a mesh pattern.

In other words, the phrase "the pairs of fitting portions are located at different sites on the outer peripheral surface of the exhaust gas treating body" means that the pair of fitting portions of the first mat located outside and the pair of fitting portions of the second mat located inside do not overlap in the thickness direction of the holding sealing material.

When the holding sealing material is wound around a round pillar-shaped exhaust gas treating body, the formula (1) or (2) needs to be satisfied to achieve a positional relationship in which the pair of fitting portions of the first mat and the pair of fitting portions of the second mat are located at different sites on the outer peripheral surface of the exhaust gas treating body.

The following formula indicates a location difference between the pairs of fitting portions using above $L_1$, $L_2$, a, and b.

Amount of the location difference between the pairs of fitting portions=$(a-b)-a/L_1 \times (L_1-L_2)$.

The above (a−b) indicates a location difference between the projected portions of the holding sealing material in a plan view.

The above "$a/L_1 \times (L_1-L_2)$" is a correction term accounting for the difference $(L_1-L_2)$ in periphery caused by winding the holding sealing material around an exhaust gas treating body.

The formula can be transformed to the following formula.

Amount of the location difference between the pairs of fitting portions=$L_2/L_1 \times a - b$ (3).

An amount of the location difference between the pairs of fitting portions represented by the formula (3) larger than the length "c" of each projected portion is one of the conditions for achieving the positional relationship in which the pair of fitting portions of the first mat and the pair of fitting portions of the second mat are located at different sites of the outer peripheral surface of the exhaust gas treating body.

In other words, the following formula needs to be satisfied.

$$(L_2/L_1 \times a-b)^2 - c^2 \geq 0 \quad (4).$$

The formula (4) maybe translated into either of the following formulas depending on whether $(L_2/L_1 \times a-b)$ is positive or negative.

When $a \geq b \times L_1/L_2$, $$a \geq L_1/L_2 \times (b+c) \quad (5).$$

When $a < b \times L_1/L_2$, $$a \leq L_1/L_2 \times (b-c) \quad (6).$$

If the amount of the location difference between the pairs of fitting portions is too large and the difference corresponds to the length of the periphery of the exhaust gas treating body, one of the pairs of fitting portions completely covers the other.

The conditions for excluding the case where the pairs of fitting portions overlap each other due to a large amount of the location difference between the pairs of fitting portions are given by the following formulas.

When $a \geq b \times L_1/L_2$, $L_2$−(amount of location difference of fitting portions)$\geq c$, namely, $$a \leq L_1/L_2 \times (b-c+L_2) \quad (7).$$

When $a < b \times L_1/L_2$, $-L_2$−(amount of location difference of fitting portions)$\leq -c$, namely, $$a \geq L_1/L_2 \times (b+c-L_2) \quad (8).$$

By summarizing the above the formulas (5) to (8), the following formulas are given.

When $a \geq b \times L_1/L_2$, $$(b+c) \times L_1/L_2 \leq a \leq (b-c+L_2) \times L_1/L_2 \quad (1).$$

When $a < b \times L_1/L_2$, $$(b+c-L_2) \times L_1/L_2 \leq a \leq (b-c) \times L_1/L_2 \quad (2).$$

A smaller amount of the location difference between the pairs of fitting portions is preferred as long as the pair of fitting portions of the first mat and the pair of fitting portions of the second mat are located at different sites of the outer peripheral surface of the exhaust gas treating body. This is because if the amount of the location difference between the pairs of fitting portions is large, the length of the entire mat will be unnecessarily long.

Specifically, the amount of the location difference between the pairs of fitting portions is preferably less than half of the periphery of the exhaust gas treating body. Such conditions are given by the following formulas.

When $a \geq b \times L_1/L_2$, $$a \leq (b+L_2/2) \times L_1/L_2 \quad (9).$$

When $a < b \times L_1/L_2$, $$a \geq (b-L_2/2) \times L_1/L_2 \quad (10).$$

By summarizing the above formulas (5), (6), (9), and (10), more desirable formulas are given:

When $a \geq b \times L_1/L_2$, $$(b+c) \times L_1/L_2 \leq a \leq (b+L_2/2) \times L_1/L_2 \quad (11).$$

When $a < b \times L_1/L_2$, $$(b-L_2/2) \times L_1/L_2 \leq a \leq (b-c) \times L_1/L_2 \quad (12).$$

The holding sealing material, the method for manufacturing the holding sealing material, the exhaust gas purifying apparatus, and the method for manufacturing the exhaust gas purifying apparatus of the sixth embodiment are the same as those of the first embodiment of the present invention, excepting the above description. Thus, the detailed explanation thereof will be omitted.

The sixth embodiment of the present invention can achieve the following effect in addition to the effects (1) to (25) described in the first to fifth embodiments of the present invention.

(26) In the holding sealing material of the present embodiment, when the holding sealing material is wound around a round pillar-shaped exhaust gas treating body, the pair of fitting portions of the first mat and the pair of fitting portions of the second mat satisfy the above formula (1) or (2), and the pair of fitting portions of the first mat and the pair of fitting portions of the second mat are located at different sites on the outer peripheral surface of the exhaust gas treating body.

If a pair of fitting portions has a gap, the pair of fitting portions locally has a lower surface pressure compared to other portions of the holding sealing material. In contrast, in the case where the pairs of fitting portions are placed in locations satisfying the formulas, when the holding sealing material is wound around an exhaust gas treating body, the pair of fitting portions of the first mat and the pair of fitting portions of the second mat are located at different sites. Thus, the portions with a locally low surface pressure do not overlap in the thickness direction of the holding sealing material. As a result, the holding sealing material can obtain a uniformed surface pressure distribution.

(Seventh Embodiment)

The following describes a seventh embodiment that includes an embodiment of the holding sealing material, the method for manufacturing the holding sealing material, the exhaust gas purifying apparatus, and the method for manufacturing the exhaust gas purifying apparatus.

In a holding sealing material according to the seventh embodiment of the present invention, the portion where the first mat and the second mat are foldably connected is located in the perpendicular direction to the longitudinal direction of the first mat and the longitudinal direction of the second mat.

FIG. 17A illustrates a schematic plan view of an example of the holding sealing material according to the seventh embodiment of the present invention.

FIG. 17B illustrates a schematic plan view of the holding sealing material illustrated in FIG. 17A, in which the portions where the first mat and the second mat are connected are folded to layer the first mat and second mat.

FIG. 17C illustrates a front view of FIG. 17B.

The holding sealing material 8 of the present embodiment illustrated in FIG. 17A is formed of a one-sheet mat 810 including inorganic fibers.

The one-sheet mat 810 includes a first mat 811 and a second mat 812.

In FIG. 17A, the second mat 812 is indicated by a mesh pattern for distinction of the first mat 811 and second mat 812.

The first mat 811 includes a projected portion 815a and a recessed portion 815b to form a pair of fitting portions, and the second mat 812 includes a projected portion 816a and a recessed portion 816b to form a pair of fitting portions.

The first mat 811 and the second mat 812 are located in such a manner that the projected portion 816a of the second mat 812 fits to the recessed portion 815b of the first mat 811.

In the holding sealing material 8 illustrated in FIG. 17A, a first side face 811a of the first mat 811 refers to a side face perpendicular to the longitudinal direction of the first mat, not a side face in parallel thereto. A second side face 812a of the second mat 812 refers to a side face perpendicular to the longitudinal direction of the second mat, not a side face in parallel thereto.

Connected portions 813 where the first mat 811 and the second mat 812 are connected correspond to the parts where the side face 811a and the side face 812a are connected, and also to the end portions of the protruded portions of the recessed portion 815b of the first mat 811. Thus, the connected portions 813 are formed at two sites.

The connected portions 813 each may include a slit 814 (refer to FIG. 17C).

The second mat 812 can be layered on the first mat 811 by folding the two connected portions 813 as illustrated in FIG. 17B and FIG. 17C.

In the layered holding sealing material 8, the projected portion 816a of the second mat 812 protrudes to the right.

FIG. 18A illustrates a schematic plan view of another example of the holding sealing material according to the seventh embodiment of the present invention.

FIG. 18B illustrates a schematic plan view of the holding sealing material illustrated in FIG. 18A, in which the portion where the first mat and the second mat are connected is folded to layer the first mat and the second mat.

FIG. 18C illustrates a front view of FIG. 18B.

A holding sealing material 9 of the present embodiment illustrated in FIG. 18A is formed of a one-sheet mat 910 including inorganic fibers.

The one-sheet mat 910 includes a first mat 911 and a second mat 912.

In FIG. 18A, the second mat 912 is indicated by a mesh pattern for distinction of the first mat 911 and the second mat 912.

The first mat 911 includes a projected portion 915a and a recessed portion 915b to form a pair of fitting portions, and the second mat 912 includes a projected portion 916a and a recessed portion 916b to form a pair of fitting portions.

The first mat 911 and the second mat 912 are located in such a manner that the projected portion 916a of the second mat 912 fit to the recessed portion 915b of the first mat 911.

In the holding sealing material 9 illustrated in FIG. 18A, a first side face 911a of the first mat 911 refers to a side face perpendicular to the longitudinal direction of the first mat, not a side face in parallel thereto. A second side face 912a of the second mat 912 refers to a side face perpendicular to the longitudinal direction of the second mat, not a side face in parallel thereto.

A connected portion 913 where the first mat 911 and the second mat 912 are foldably connected corresponds to the portion where the side face 911a and the side face 912a are connected and also to the tip end of the projected portion 916a of the second mat 912.

The connected portion 913 may include a slit 914 (refer to FIG. 18C).

In the holding sealing material 9 illustrated in FIG. 18A, the second mat 912 can be layered on the first mat 911 by folding the connected portion 913 as illustrated in FIG. 18B and FIG. 18C.

In the layered holding sealing material 9, the recessed portion 915b of the first mat 911 protrudes to the right.

The holding sealing material, the method for manufacturing the holding sealing material, the exhaust gas purifying apparatus, and the method for manufacturing the exhaust gas purifying apparatus of the seventh embodiment are the same as those of the first embodiment of the present invention, excepting the above description. Thus, the detailed explanation thereof will be omitted.

The seventh embodiment of the present invention can achieve the effects (1) to (5), (8) to (20), and (23) to (25), which are described in the first, fourth, or fifth embodiment of the present invention.

(Eighth Embodiment)

The following describes an eighth embodiment that includes an embodiment of the holding sealing material, the method for manufacturing the holding sealing material, the exhaust gas purifying apparatus, and the method for manufacturing the exhaust gas purifying apparatus.

A holding sealing material according to the eighth embodiment of the present invention is a holding sealing material including a one-sheet mat that includes inorganic fibers, the one-sheet mat including a first rectangular mat being substantially rectangular in a plan view, and a second rectangular mat being substantially rectangular in a plan view and integrally connected to the first rectangular mat, wherein a border line between the first rectangular mat and the second rectangular mat is part of a side of a rectangle of the first rectangular mat in a plan view and part of a side of a rectangle of the second rectangular mat in a plan view, and the first rectangular mat and second rectangular mat are configured to be layered by folding the one-sheet mat along the border line.

Figure 19A:
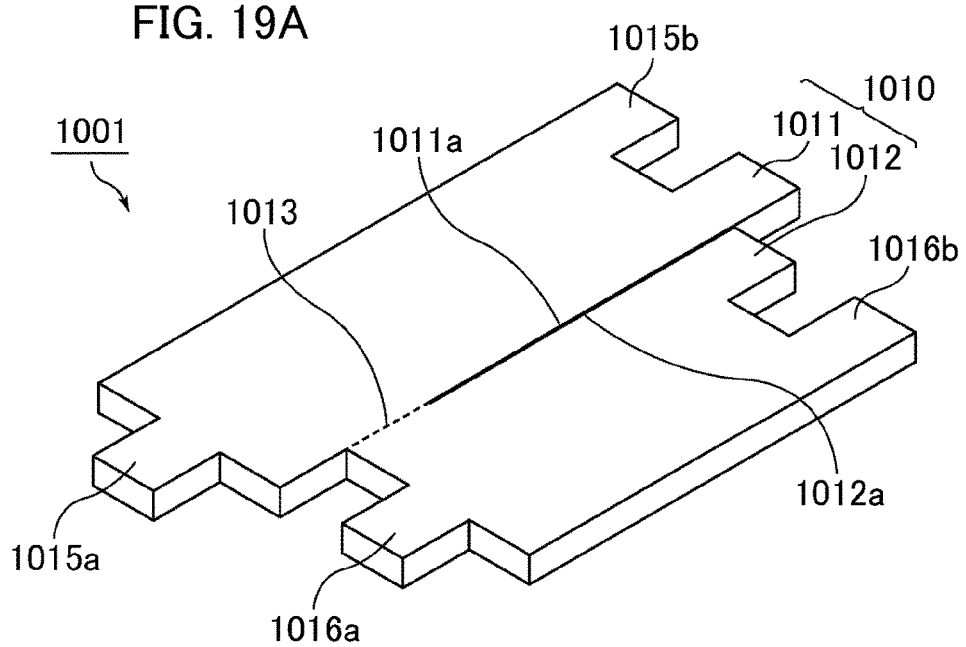
FIG. 19A illustrates a schematic perspective view of an example of the holding sealing material according to the eighth embodiment of the present invention.
Figure 19B:
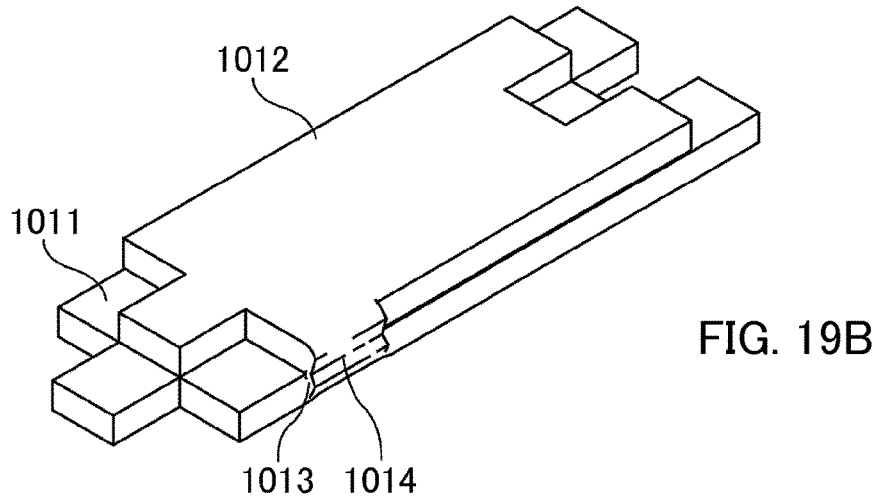
FIG. 19B illustrates a schematic perspective view of the holding sealing material illustrated in FIG. 19A, in which the one-sheet mat is folded along a border line between the first rectangular mat and the second rectangular mat to layer the first rectangular mat and the second rectangular mat.

FIG. 19A illustrates a schematic perspective view of an example of the holding sealing material according to the eighth embodiment of the present invention. FIG. 19B illustrates a schematic perspective view of the holding sealing material illustrated in FIG. 19A, in which the one-sheet mat is folded along a border line between the first rectangular mat and the second rectangular mat to layer the first rectangular mat and the second rectangular mat.

A holding sealing material 1001 of the present embodiment illustrated in FIG. 19A is formed of a one-sheet mat 1010 including inorganic fibers. The one-sheet mat 1010 includes a first rectangular mat 1011 with a substantially rectangular shape in a plan view and a second rectangular mat 1012 with a substantially rectangular shape in a plan view.

The first rectangular mat 1011 includes a projected portion 1015a and a recessed portion 1015b to form a pair of fitting portions. The second rectangular mat 1012 includes a projected portion 1016a and a recessed portion 1016b to form a pair of fitting portions.

The phrase "a mat with a substantially rectangular shape in a plan view" includes a mat of a rectangular shape in a plan view, and, if a mat includes a pair of fitting portions, a mat of a rectangular shape in a plan view when the pair of fitting portions is excluded.

The first rectangular mat 1011 and the second rectangular mat 1012 are integrally connected, and a border line 1013 is present between the first rectangular mat 1011 and the second rectangular mat 1012.

The border line 1013 is part of a side 1011a of the rectangle (rectangle excluding the fitting portion) of the first rectangular mat 1011 in a plan view and also part of a side 1012a of the rectangle (rectangle excluding the fitting portion) of the second rectangular mat 1012 in a plan view.

Although the border line 1013 is indicated by a dotted line in FIG. 19, there is no distinguishable portion on the dotted line.

The one-sheet mat 1010 of the holding sealing material 1001 of the present embodiment can be folded along the border line 1013 as illustrated in FIG. 19B.

Thus, the second rectangular mat 1012 can be layered on the first rectangular mat 1011 to form a layered mat.

The holding sealing material 1001 may include a slit 1014 for folding along the border line 1013 as illustrated in FIG. 19B.

The holding sealing material of the present embodiment can be manufactured according to the method for manufacturing the holding sealing material of the first embodiment of the present invention. The embodiments of the exhaust gas purifying apparatus and the method for manufacturing the exhaust gas purifying apparatus of the present embodiment are the same as those of the first embodiment of the present invention. Thus, the detailed explanation thereof will be omitted.

The following lists the effects of the holding sealing material, the method for manufacturing the holding sealing material, the exhaust gas purifying apparatus, and the method for manufacturing the exhaust gas purifying apparatus of the eighth embodiment of the present invention.

(27) The holding sealing material of the present embodiment is formed of a one-sheet mat, and the one-sheet mat includes a first rectangular mat and a second rectangular mat. The first rectangular mat and the second rectangular mat are integrally connected.

The first rectangular mat and the second rectangular mat can be layered by folding the one-sheet mat along the border line between the first rectangular mat and the second rectangular mat.

This configuration enables to manufacture a holding sealing material with plural layers of mats. Since the holding sealing material with plural layers of mats has a larger thickness, the holding sealing material obtains high thermal insulation performance.

In addition, since the holding sealing material as a whole is made of a one-sheet mat, the mats are layered without having a wrong combination.

(28) In the holding sealing material of the present embodiment, the border line between the first rectangular mat and the second rectangular mat is part of a side of the rectangle of the first rectangular mat in a plan view and part of a side of the rectangle of the second rectangular mat in a plan view.

This means that a side of the rectangle of the first mat in a plan view and a side of the rectangle of the second mat in a plan view are not entirely connected, and that there is a separated portion between the side of the rectangle of the first mat in a plan view and the side of the rectangle of the second mat in a plan view.

This configuration prevents the holding sealing material from having creases when wound around the exhaust gas treating body, thereby achieving easy winding.

(29) The holding sealing material of the present embodiment does not include other materials for fixing mats, such as an adhesive material or machine sewing thread, at the portion where the first mat and the second mat are connected. The portion where the first rectangular mat and the second rectangular mat are connected includes only materials for integrally forming the first mat and the second mat. Thus, the amount of organic components in exhaust gases when the holding sealing material is exposed to high temperatures in an exhaust gas purifying apparatus can be reduced.

If the holding sealing material according to the eighth embodiment of the present invention includes each configuration mentioned in the first to seventh embodiments, the effects (4) to (26) described in the first to seventh embodiments of the present invention can be achieved in addition to the effects (27) to (29).

EXAMPLES

The following describes examples where the embodiments of the present invention are more specifically disclosed. The embodiments of the present invention are, however, not limited to these examples.

Example 1

A base mat made of alumina fibers including an alumina-silica composition having a composition ratio of $Al_2O_3$:$SiO_2$=72:28 was prepared. The base mat was needle-punched and thereby a needle-punched mat with a bulk density of 0.15 g/cm$^3$ and a weight per unit area of 1050 g/cm$^2$ was obtained.

Separately, acrylic latex was sufficiently dispersed in water to prepare an acrylic latex emulsion. This acrylic latex emulsion was used as a binder.

Next, the needle-punched mat was cut into a size of 1,250 mm in length and 1,200 mm in width in a plan view. The above prepared binder was uniformly sprayed to this needle-punched mat with a spray in such a manner that the amount of the binder was 1.0% by weight relative to the amount of the alumina fibers of the needle-punched mat.

The needle-punched mat with the binder was then exposed to through-flow drying at 140° C. for six minutes to prepare a mat material.

Subsequently, one-sheet mats having a shape as illustrated in FIG. 1A were punched out from the mat material.

Punching out the mat material was carried out using a Thomson blade and an oil press machine.

The dimensions of the punched out one-sheet mats were as follows: length $L_1$ of the first mat in the longitudinal direction=883 mm; width $W_1$ of the first mat=295 mm; thickness $T_1$ of the first mat=9.1 mm; length $L_2$ of the second mat in the longitudinal direction=826 mm; width $W_2$ of the second mat=295 mm; thickness $T_2$ of the second mat=9.1 mm; length L in the longitudinal direction of the one-sheet mat=$L_1$=883 mm;

length D of the connected portion=5 mm;

distance "a" from the "starting position of the projected portion" to the "center of the connected portion" of the first mat=15 mm; and distance "b" from the "starting position of the projected portion" to the "center of the connected portion" of the second mat=15 mm.

The connected portion was not provided with a slit.

These dimensions are shown in Table 1.

The connected portion was folded to layer the second mat on the first mat, thereby manufacturing a holding sealing material in which the first mat and the second mat are layered. The ease of folding was sensory evaluated by the workers.

The ease of folding was indicated by four levels: +++: very easily folded, ++: easily folded, +: foldable, and −: difficult to be folded.

The holding sealing material of Example 1 was evaluated as "+++: very easily folded".

The degree of the location difference of the mats in the width direction when the holding sealing material was folded was visually evaluated.

The degree of the location difference was indicated by four levels: +++: no location difference, ++: a small location difference, +: a slightly large location difference, and −: a large location difference.

The holding sealing material of Example 1 was evaluated as "+: a slightly large location difference".

The degree of creases on the mat (the second mat) nearer to the exhaust gas treating body was visually evaluated when the holding sealing material was wound around an exhaust gas treating body (SiC honeycomb filter) with a diameter of 254 mm (10 inches).

The degree of creases was indicated by three levels: ++: no creases, +: small creases, and −: large creases. The holding sealing material of Example 1 was evaluated as "++: no creases".

The connected portion was visually evaluated on whether the connected portion was separated or not when the connected portion was folded.

The connected portion was indicated by three levels: ++: no separation, +: a small separation, and −: a large separation. The holding sealing material of Example 1 was evaluated as "++: no separation".

The holding sealing material was visually evaluated on whether the pair of fitting portions of the first mat was to overlap the pair of fitting portions of the second mat when the holding sealing material was wound around the exhaust gas treating body (SiC honeycomb filter) with a diameter of 254 mm (10 inches).

The holding sealing material was indicated by two levels: +: having no overlap between the pairs of fitting portions, and −: having an overlap between the pairs of fitting portions. The holding sealing material of Example 1 was evaluated as "−: having an overlap between the pairs of fitting portions".

Tables 1 and 2 show the evaluation results of the one-sheet mat used in Example 1.

"Added organic components for fixing" in Table 2 refers to the amount of organic components used for fixing the first mat and the second mat, and the amount (%) was shown with the weight of the whole one-sheet mat defined as 100%. In Example 1, since no organic components were used for fixing the first mat and the second mat, this value was 0%.

Examples 2 to 7

Holding sealing materials were manufactured in the same manner as in Example 1, except that the length D of the connected portion was changed according to Table 1 in punching out.

The dimensions and the evaluation results of the holding sealing materials are illustrated in Tables 1 and 2.

Examples 8 to 10

Holding sealing materials were manufactured in the same manner as in Example 1, except that the values of the distances "a" and "b" from the starting position of the projected portion to the center of the connected portion were changed according to Table 1 in punching out.

The dimensions and the evaluation results of the holding sealing materials are illustrated in Tables 1 and 2.

Examples 11 to 14

A slit with a depth "t" shown in Table 1 was formed in the connected portion of the one-sheet mat, and the one-sheet mat was folded in the direction the slit spread out, to obtain a holding sealing material. All other configurations except the slit were the same as in Example 8.

The dimensions and the evaluation results of the holding sealing materials were illustrated in Tables 1 and 2.

Example 15

A holding sealing material was manufactured in the same manner as in Example 8, except that the arrangement of the recessed portion and projected portion of the pair of fitting portions of the first mat was made different from the arrangement of the recessed portion and projected portion of the pair of fitting portions of the second mat in punching out as illustrated in FIG. 6.

The dimensions and the evaluation results of the holding sealing material were illustrated in Tables 1 and 2.

Example 16

A holding sealing material was manufactured in the same manner as in Example 8, except that two connected portions were formed in punching out as illustrated in FIG. 10.

Dimensions of the connected portions were determined as follows: length of one of the connected portions Da=50 mm; length of the other connected portion Db=4 mm.

Da refers to the length of the connected portion nearer to the projected portion, and Db refers to the length of the connected portion nearer to the recessed portion.

The dimensions and the evaluation results of the holding sealing material are shown in Tables 1 and 2. The length D of the connected portion in Table 1 is shown as the value of Da. As for the distances "a" and "b" from the starting position of the projected portions to the center of the connected portion in Table 1, the values were calculated based on Da.

The dimensions and the evaluation results of the holding sealing material are shown in Tables 1 and 2.

Comparative Example 1

A one-sheet mat was manufactured in which a side face of the first mat was entirely connected to a side face of the second mat.

The length of the first mat and the length of the second mat in the longitudinal direction were both equally 883 mm, and thus the length of the connected portions was also 883 mm.

All other configurations were the same as in Example 1.

Dimensions and the evaluation results of the holding sealing material are shown in Tables 1 and 2.

Comparative Example 2

A mat material was manufactured in the same manner as in Example 1. In punching out, the mat material was punched out in such a manner that the first mat and the second mat were separated to obtain the first mat and the second mat separately.

The length $L_1$ of the first mat in the longitudinal direction was determined to 883 mm, and the length $L_2$ of the second mat in the longitudinal direction was determined to 826 mm.

Subsequently, the first mat and the second mat were layered after applying a binder therebetween, press-fixed, and dried at 110° C. for 20 minutes. Thereby, the first mat and the second mat were bonded to obtain a holding sealing material.

The binder applied area was determined to 50 mm in the longitudinal direction and 295 mm in the width direction. An acrylic latex emulsion was used as the binder.

The dimensions and the evaluation results of the holding sealing material are shown in Tables 1 and 2.

Comparative Example 3

A holding sealing material was manufactured in the same manner as in Comparative Example 2, except that the first mat and the second mat were fixed by sewing with thread using a sewing machine, instead of binding with a binder.

Cotton thread was used as the thread.

Dimensions and the evaluation results of the holding sealing material are shown in Tables 1 and 2.

TABLE 1

| | Length of mat in the longitudinal direction | | Length of projected portion of each pairs of fitting portions | Length of connected portion | | Distance from "starting position of the projected portion" to "center of the connected portion" | | Location difference between pairs of fitting portions | Thickness of mat | Depth of slit | Rate of the depth of slit | Fixing | Note |
|---|---|---|---|---|---|---|---|---|---|---|---|---|---|
| | $L_2$ [mm] | $L_1$ (=L) [mm] | c [mm] | D [mm] | D/L [—] | b [mm] | a [mm] | | T [mm] | t [mm] | t/T | | |
| Example 1 | 826 | 883 | 50 | 5 | 0.006 | 15 | 15 | None | 9.1 | 0.0 | 0.0 | None | — |
| Example 2 | 826 | 883 | 50 | 50 | 0.057 | 25 | 25 | None | 9.1 | 0.0 | 0.0 | None | — |
| Example 3 | 826 | 883 | 50 | 100 | 0.113 | 50 | 50 | None | 9.1 | 0.0 | 0.0 | None | — |
| Example 4 | 826 | 883 | 50 | 200 | 0.227 | 100 | 100 | None | 9.1 | 0.0 | 0.0 | None | — |
| Example 5 | 826 | 883 | 50 | 300 | 0.340 | 150 | 150 | None | 9.1 | 0.0 | 0.0 | None | — |
| Example 6 | 826 | 883 | 50 | 4 | 0.005 | 2 | 2 | None | 9.1 | 0.0 | 0.0 | None | — |
| Example 7 | 826 | 883 | 50 | 400 | 0.453 | 200 | 200 | None | 9.1 | 0.0 | 0.0 | None | — |
| Example 8 | 826 | 883 | 50 | 50 | 0.057 | 100 | 25 | Present | 9.1 | 0.0 | 0.0 | None | — |
| Example 9 | 826 | 883 | 50 | 50 | 0.057 | 200 | 25 | Present | 9.1 | 0.0 | 0.0 | None | — |
| Example 10 | 826 | 883 | 50 | 50 | 0.057 | 300 | 25 | Present | 9.1 | 0.0 | 0.0 | None | — |
| Example 11 | 826 | 883 | 50 | 50 | 0.057 | 100 | 25 | Present | 9.1 | 3.0 | 0.33 | None | — |
| Example 12 | 826 | 883 | 50 | 50 | 0.057 | 100 | 25 | Present | 9.1 | 6.0 | 0.66 | None | — |
| Example 13 | 826 | 883 | 50 | 50 | 0.057 | 100 | 25 | Present | 9.1 | 7.0 | 0.77 | None | — |
| Example 14 | 826 | 883 | 50 | 50 | 0.057 | 100 | 25 | Present | 9.1 | 8.0 | 0.9 | None | — |
| Example 15 | 826 | 883 | 50 | 50 | 0.057 | 100 | 25 | Present | 9.1 | 0.0 | 0.0 | None | Different orientations of recessed and projected portions between the mats |
| Example 16 | 826 | 883 | 50 | 50 | 0.057 | 100 | 25 | Present | 9.1 | 0.0 | 0.0 | None | Two connected portions |
| Comparative Example 1 | 883 | 883 | 50 | 883 | 1.000 | 441.5 | 441.5 | None | 9.1 | 0.0 | 0.0 | None | — |
| Comparative Example 2 | 826 | 883 | 50 | — | — | 413 | 441.5 | None | 9.1 | 0.0 | 0.0 | Bonded with a binder | No connected portion |
| Comparative Example 3 | 826 | 883 | 50 | — | — | 413 | 441.5 | None | 9.1 | 0.0 | 0.0 | Fixed by sewing with thread | No connected portion |

Location difference between pairs of fitting portions: Indicated "Present" if the position of the pair of fitting portions of the first mat is different from that of the second mat, or indicated "None" if the pair of fitting portions of the first mat overlaps that of the second mat.

TABLE 2

| | Added organic components for fixing [%] | Ease of folding when folded | Displacement in the width direction when folded | Creases when wound | Separation of connected portion |
|---|---|---|---|---|---|
| Example 1 | 0 | +++ | + | ++ | ++ |
| Example 2 | 0 | ++ | + | ++ | ++ |
| Example 3 | 0 | ++ | ++ | ++ | ++ |
| Example 4 | 0 | ++ | ++ | + | ++ |
| Example 5 | 0 | + | ++ | + | ++ |
| Example 6 | 0 | +++ | + | ++ | − |
| Example 7 | 0 | + | ++ | − | ++ |
| Example 8 | 0 | ++ | ++ | ++ | ++ |
| Example 9 | 0 | ++ | ++ | ++ | ++ |
| Example 10 | 0 | ++ | ++ | ++ | ++ |
| Example 11 | 0 | +++ | ++ | ++ | ++ |
| Example 12 | 0 | +++ | ++ | ++ | ++ |
| Example 13 | 0 | +++ | ++ | ++ | + |
| Example 14 | 0 | +++ | ++ | ++ | − |
| Example 15 | 0 | ++ | ++ | ++ | ++ |
| Example 16 | 0 | ++ | +++ | ++ | ++ |
| Comparative Example 1 | 0 | − | ++ | − | ++ |
| Comparative Example 2 | 1.4 | ++ | ++ | ++ | ++ |
| Comparative Example 3 | 0.2 | ++ | ++ | ++ | ++ |

The one-sheet mats manufactured in Examples 1 to 16 each can work as a holding sealing material with plural layers of mats by folding the connected portion.

The ease of folding was particularly high when the length of the connected portion was short, or when the connected portion had a slit.

The displacement in the width direction in the folding the holding sealing material was small when the length of the connected portion was not too short. In particular, no displacement occurred when two connected portions were formed.

When the length of the connected portion was not too long, the holding sealing material had no creases in the winding the holding sealing material around an exhaust gas treating body, thereby achieving easy winding.

When the length of the connected portion was not too short, or when the depth of the slit was not too deep, the connected portion was not separated when the connected portion was folded.

In Example 16, in which two connected portions were formed, winding efficiency was improved by cutting the shorter connected portion (Db=4 mm) in winding the holding sealing material.

When the holding sealing materials of Examples 8 to 16 each were wound around an exhaust gas treating body, the pairs of fitting portions did not overlap. Such holding sealing materials have a uniform surface pressure distribution.

The holding sealing material of Comparative Example 1 was difficult to be folded at the connected portion to form a layered mat because a side face of the first mat was entirely connected to that of the second mat. In addition, the holding sealing materials had large creases when wound around an exhaust gas treating body.

In the holding sealing materials of Comparative Examples 2 and 3, an organic component (binder or thread) was used for layering the first mat and the second mat. Thus, the amount of the added organic components was increased.
(Other Embodiments)

In the holding sealing material of the embodiments of the present invention, the number of mats to be layered is not limited to two, and three or more mats may be layered.

Examples of such an embodiment include a configuration in which a third mat is further provided in such a manner that the third mat and the first mat are foldably connected in the same manner as that the first mat and the second mat are fordable and connected in the holding sealing material of the first embodiment of the present invention.

In other words, the holding sealing material of the embodiment of the present invention is a holding sealing material in which a one-sheet mat can form at least two layers.

In the holding sealing material of the embodiments of the present invention, the shapes of the recessed portion and the projected portion are not particularly limited as long as the recessed portion and the projected portion can fit to each other. If the pair of fitting portions consists of a combination of a recessed portion and a projected portion, the projected portion preferably has a size of 10 mm (width)×10 mm (length) to 300 mm (width)×100 mm (length), and the recessed portion preferably has a shape which fits to the corresponding projected portion.

If an exhaust gas purifying apparatus is manufactured using a holding sealing material with such a recessed portion and a projected portion, the exhaust gas treating body can be reliably held by the holding sealing material, thereby providing excellent handleability.

A projected portion having a size smaller than 10 mm (width)×10 mm (length), or a size larger than 300 mm (width)×100 mm (length) reduces the contact area between the ends of the holding sealing material when the holding sealing material was wound around an exhaust gas treating body. Thus, the ends of the holding sealing material are less likely to be contacted. As a result, the holding sealing material is less likely to hold the exhaust gas treating body.

The holding sealing material of the embodiments of the present invention may have plural sets of a recessed portion and a projected portion to fit to each other at shorter sides of the holding sealing material, or may have no recessed portion or projected portion.

The shape of the exhaust gas treating body forming the exhaust gas purifying apparatus of the embodiments of the present invention is not particularly limited as long as it has a pillar shape, and may have any shape with any size, such as substantially an elliptic pillar-shape and substantially a prism shape in addition to substantially a round pillar shape.

The exhaust gas treating body forming the exhaust gas purifying apparatus of the embodiments of the present invention may be an exhaust gas treating body that is made of cordierite or the like and has an integral honeycomb structured body as illustrated in FIG. 4A, or may be an exhaust gas treating body that is made of silicon carbide or the like and has an aggregated honeycomb structured body obtained by combining plural column-like honeycomb fired bodies having a large number of through holes each divided by the partitioning walls and arranged in the longitudinal direction via an adhesive layer containing mainly a ceramic.

The exhaust gas treating body forming the exhaust gas purifying apparatus of the embodiments of the present invention may support a catalyst.

Examples of the catalyst supported on the exhaust gas treating body include noble metals such as platinum, palladium, and rhodium; alkali metals such as potassium and sodium; alkaline-earth metals such as barium; and metal oxides such as a cerium oxide. One of these catalysts may be used alone, and two or more of them may be used in combination.

If the exhaust gas treating body of the exhaust gas purifying apparatus according to the embodiments of the present invention has a honeycomb structured body, the exhaust gas treating body may have a configuration with no plugs in the cells, that is, the end portions of the cells are not plugged. In such a configuration, the exhaust gas treating body supports a catalyst such as platinum as a catalyst support that purifies harmful gas components in exhaust gases, such as CO, HC, and NOx.

The essential configuration of the holding sealing material of the embodiment of the present invention includes a one-sheet mat that includes inorganic fibers, the one-sheet mat including a first mat with a first side face and a second mat with a second side face, and apart of the first side face and apart of the second side face are foldably and integrally connected.

The essential configuration of the method for manufacturing the holding sealing material of the embodiment of the present invention includes preparing a mat material including inorganic fibers, punching out, and layering.

The essential configuration of the exhaust gas purifying apparatus of the embodiment of the present invention and the method for manufacturing the exhaust gas purifying apparatus of the embodiment of the present invention include using the holding sealing material of the embodiment of the present invention.

To these essential configurations may be appropriately added various configurations (e.g. location and number of the connected portion(s), presence of slit(s), presence of fitting portions, and arrangement of fitting portions) described in the first to eighth embodiments of the present invention or in other embodiments of the present invention, to obtain desired effects.

Obviously, numerous modifications and variations of the present invention are possible in light of the above teachings. It is therefore to be understood that within the scope of the appended claims, the invention may be practiced otherwise than as specifically described herein.

The invention claimed is:

1. A holding sealing material comprising:
   a one-sheet mat including inorganic fibers and comprising:
      a first mat with a first side face; and
      a second mat with a second side face, a part of said first side face and a part of said second side face being foldably and integrally connected,
   wherein said first mat and said second mat each have a pair of fitting portions configured to fit to each other when the holding sealing material is wound around an exhaust gas treating body.

2. The holding sealing material according to claim 1, wherein a length of said first mat in a longitudinal direction is different from a length of said second mat in a longitudinal direction.

3. The holding sealing material according to claim 1, wherein a portion where said first mat and said second mat are foldably connected is provided in a direction parallel to a longitudinal direction of said first mat and a longitudinal direction of said second mat.

4. The holding sealing material according to claim 3,
wherein the portion where said first mat and said second mat are foldably connected is from about 1/20 to about 1/3 a length of said one-sheet mat in a longitudinal direction.

5. The holding sealing material according to claim 3,
wherein the portion where said first mat and said second mat are foldably connected has a length of from about 5 to about 150 mm.

6. The holding sealing material according to claim 1,
wherein a portion where said first mat and said second mat are foldably connected is provided with a slit formed on at least one of a front face and a back face of said one-sheet mat in a thickness direction of said one-sheet mat.

7. The holding sealing material according to claim 6,
wherein a depth of said slit is from about 1/5 to about 4/5 a thickness of said one-sheet mat.

8. The holding sealing material according to claim 1,
wherein the pair of fitting portions of said first mat and the pair of fitting portions of said second mat each have a recessed portion and a projected portion, and arrangement of the recessed portion and projected portion of the first mat is different from arrangement of the recessed portion and projected portion of the second mat.

9. The holding sealing material according to claim 1,
wherein, when the holding sealing material is wound around a round pillar-shaped exhaust gas treating body, the pair of fitting portions of said first mat and the pair of fitting portions of said second mat satisfy a following formula (1) or (2), and the pair of fitting portions of said first mat and the pair of fitting portions of said second mat are located at different sites on an outer peripheral surface of the exhaust gas treating body, the formulas being:

when $a \geq b \times L_1/L_2$, $$(b+c) \times L_1/L_2 \leq a \leq (b-c+L_2) \times L_1/L_2 \quad (1),$$

when $a \leq b \times L_1/L_2$, $$(b+c-L_2) \times L_1/L_2 \leq a \leq (b-c) \times L_1/L_2 \quad (2),$$

a: distance from a "starting position of the projected portion" to a "center of a connected portion" of said first mat b: distance from a "starting position of the projected portion" to a "center of a connected portion" of said second mat c: length of the projected portion of each fitting portion $L_1$: length of said first mat in a longitudinal direction $L_2$: length of said second mat in a longitudinal direction.

10. The holding sealing material according to claim 1,
wherein two or more of portions where said first mat and said second mat are foldably connected are provided.

11. The holding sealing material according to claim 10,
wherein one of the portions where said first mat and said second mat are foldably connected is shorter and more scissile than another connected portion or connected portions.

12. The holding sealing material according to claim 1,
wherein said one-sheet mat has a thickness of from about 1.5 to about 15 mm.

13. The holding sealing material according to claim 1,
wherein said one-sheet mat further comprises identification information for identifying a folding direction on at least one surface.

14. The holding sealing material according to claim 1,
wherein a length of said first mat in a width direction perpendicular to a longitudinal direction is different from a length of said second mat in a width direction perpendicular to a longitudinal direction.

15. The holding sealing material according to claim 14,
wherein a difference between the length of said first mat in said width direction and the length of said second mat in said width direction is about 10 mm or less.

16. A holding sealing material comprising:
a one-sheet mat including inorganic fibers and comprising:
  a first mat with a first side face; and
  a second mat with a second side face, a part of said first side face and a part of said second side face being foldably and integrally connected,
wherein two or more of portions where said first mat and said second mat are foldably connected are provided, and
wherein one of the portions where said first mat and said second mat are foldably connected is shorter and more scissile than another connected portion or connected portions.

* * * * *